United States Patent
Sun et al.

(10) Patent No.: US 9,349,394 B1
(45) Date of Patent: May 24, 2016

(54) METHOD FOR FABRICATING A MAGNETIC WRITER HAVING A GRADIENT SIDE GAP

(71) Applicant: Western Digital (Fremont), LLC, Fremont, CA (US)

(72) Inventors: Hai Sun, Milpitas, CA (US); Ming Jiang, San Jose, CA (US); Ronghui Zhou, Fremont, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 39 days.

(21) Appl. No.: 14/135,250

(22) Filed: Dec. 19, 2013

Related U.S. Application Data

(60) Provisional application No. 61/893,101, filed on Oct. 18, 2013.

(51) Int. Cl.
*B44C 1/22* (2006.01)
*G11B 5/127* (2006.01)
*G11B 5/23* (2006.01)

(52) U.S. Cl.
CPC ..................................... *G11B 5/232* (2013.01)

(58) Field of Classification Search
CPC .... G11B 5/1278; G11B 5/3116; G11B 5/315; G11B 5/3163; G11B 5/232; Y10T 29/49043; Y10T 29/49044; Y10T 29/49046; Y10T 29/49048; Y10T 29/49052
USPC ........... 216/22, 41, 67, 42, 47, 83; 427/419.2, 427/548; 428/812, 815, 815.2; 438/689, 438/745; 204/192.1, 192.34; 252/79.1, 252/79.4; 360/121, 122, 125.03, 125.02, 360/119.02; 29/603.14, 603.13, 603.15, 29/603.16, 603.18, 603.07
See application file for complete search history.

(56) References Cited

U.S. PATENT DOCUMENTS

| | | | |
|---|---|---|---|
| 6,016,290 A | 1/2000 | Chen et al. |
| 6,018,441 A | 1/2000 | Wu et al. |
| 6,025,978 A | 2/2000 | Hoshi et al. |
| 6,025,988 A | 2/2000 | Yan |
| 6,032,353 A | 3/2000 | Hiner et al. |
| 6,033,532 A | 3/2000 | Minami |
| 6,034,851 A | 3/2000 | Zarouri et al. |
| 6,043,959 A | 3/2000 | Crue et al. |
| 6,046,885 A | 4/2000 | Aimonetti et al. |
| 6,049,650 A | 4/2000 | Jerman et al. |
| 6,055,138 A | 4/2000 | Shi |
| 6,058,094 A | 5/2000 | Davis et al. |

(Continued)

OTHER PUBLICATIONS

Xianzhong Zeng, et al., U.S. Appl. No. 13/898,160, filed May 20, 2013, 12 pages.

(Continued)

*Primary Examiner* — Nadine Norton
*Assistant Examiner* — Christopher Remavege

(57) ABSTRACT

A method provides a magnetic transducer having an air-bearing surface (ABS) location. The method provides a main pole using a plurality of masks including a plurality of apertures therein. The plurality of apertures overlap in an overlap region. At least a portion of the main pole resides in the overlap region. A side gap adjacent to a portion of the main pole is provided. The side gap has a conformal portion and a nonconformal portion. The conformal portion is adjacent to the ABS location and the overlap region. The conformal portion is between the ABS location and the nonconformal portion. A side shield is provided. The side gap residing between the side shield and the main pole.

15 Claims, 14 Drawing Sheets

(56) References Cited

U.S. PATENT DOCUMENTS

| | | |
|---|---|---|
| 6,073,338 A | 6/2000 | Liu et al. |
| 6,078,479 A | 6/2000 | Nepela et al. |
| 6,081,499 A | 6/2000 | Berger et al. |
| 6,094,803 A | 8/2000 | Carlson et al. |
| 6,099,362 A | 8/2000 | Viches et al. |
| 6,103,073 A | 8/2000 | Thayamballi |
| 6,108,166 A | 8/2000 | Lederman |
| 6,118,629 A | 9/2000 | Huai et al. |
| 6,118,638 A | 9/2000 | Knapp et al. |
| 6,125,018 A | 9/2000 | Takagishi et al. |
| 6,130,779 A | 10/2000 | Carlson et al. |
| 6,134,089 A | 10/2000 | Barr et al. |
| 6,136,166 A | 10/2000 | Shen et al. |
| 6,137,661 A | 10/2000 | Shi et al. |
| 6,137,662 A | 10/2000 | Huai et al. |
| 6,160,684 A | 12/2000 | Heist et al. |
| 6,163,426 A | 12/2000 | Nepela et al. |
| 6,166,891 A | 12/2000 | Lederman et al. |
| 6,173,486 B1 | 1/2001 | Hsiao et al. |
| 6,175,476 B1 | 1/2001 | Huai et al. |
| 6,178,066 B1 | 1/2001 | Barr |
| 6,178,070 B1 | 1/2001 | Hong et al. |
| 6,178,150 B1 | 1/2001 | Davis |
| 6,181,485 B1 | 1/2001 | He |
| 6,181,525 B1 | 1/2001 | Carlson |
| 6,185,051 B1 | 2/2001 | Chen et al. |
| 6,185,077 B1 | 2/2001 | Tong et al. |
| 6,185,081 B1 | 2/2001 | Simion et al. |
| 6,188,549 B1 | 2/2001 | Wiitala |
| 6,190,764 B1 | 2/2001 | Shi et al. |
| 6,193,584 B1 | 2/2001 | Rudy et al. |
| 6,195,229 B1 | 2/2001 | Shen et al. |
| 6,198,608 B1 | 3/2001 | Hong et al. |
| 6,198,609 B1 | 3/2001 | Barr et al. |
| 6,201,673 B1 | 3/2001 | Rottmayer et al. |
| 6,204,998 B1 | 3/2001 | Katz |
| 6,204,999 B1 | 3/2001 | Crue et al. |
| 6,212,153 B1 | 4/2001 | Chen et al. |
| 6,215,625 B1 | 4/2001 | Carlson |
| 6,219,205 B1 | 4/2001 | Yuan et al. |
| 6,221,218 B1 | 4/2001 | Shi et al. |
| 6,222,707 B1 | 4/2001 | Huai et al. |
| 6,229,782 B1 | 5/2001 | Wang et al. |
| 6,230,959 B1 | 5/2001 | Heist et al. |
| 6,233,116 B1 | 5/2001 | Chen et al. |
| 6,233,125 B1 | 5/2001 | Knapp et al. |
| 6,237,215 B1 | 5/2001 | Hunsaker et al. |
| 6,252,743 B1 | 6/2001 | Bozorgi |
| 6,255,721 B1 | 7/2001 | Roberts |
| 6,258,468 B1 | 7/2001 | Mahvan et al. |
| 6,266,216 B1 | 7/2001 | Hikami et al. |
| 6,271,604 B1 | 8/2001 | Frank, Jr. et al. |
| 6,275,354 B1 | 8/2001 | Huai et al. |
| 6,277,505 B1 | 8/2001 | Shi et al. |
| 6,282,056 B1 | 8/2001 | Feng et al. |
| 6,296,955 B1 | 10/2001 | Hossain et al. |
| 6,297,955 B1 | 10/2001 | Frank, Jr. et al. |
| 6,304,414 B1 | 10/2001 | Crue, Jr. et al. |
| 6,307,715 B1 | 10/2001 | Berding et al. |
| 6,310,746 B1 | 10/2001 | Hawwa et al. |
| 6,310,750 B1 | 10/2001 | Hawwa et al. |
| 6,317,290 B1 | 11/2001 | Wang et al. |
| 6,317,297 B1 | 11/2001 | Tong et al. |
| 6,322,911 B1 | 11/2001 | Fukagawa et al. |
| 6,330,136 B1 | 12/2001 | Wang et al. |
| 6,330,137 B1 | 12/2001 | Knapp et al. |
| 6,333,830 B2 | 12/2001 | Rose et al. |
| 6,340,533 B1 | 1/2002 | Ueno et al. |
| 6,349,014 B1 | 2/2002 | Crue, Jr. et al. |
| 6,351,355 B1 | 2/2002 | Min et al. |
| 6,353,318 B1 | 3/2002 | Sin et al. |
| 6,353,511 B1 | 3/2002 | Shi et al. |
| 6,356,412 B1 | 3/2002 | Levi et al. |
| 6,359,779 B1 | 3/2002 | Frank, Jr. et al. |
| 6,369,983 B1 | 4/2002 | Hong |
| 6,376,964 B1 | 4/2002 | Young et al. |
| 6,377,535 B1 | 4/2002 | Chen et al. |
| 6,381,095 B1 | 4/2002 | Sin et al. |
| 6,381,105 B1 | 4/2002 | Huai et al. |
| 6,389,499 B1 | 5/2002 | Frank, Jr. et al. |
| 6,392,850 B1 | 5/2002 | Tong et al. |
| 6,396,660 B1 | 5/2002 | Jensen et al. |
| 6,399,179 B1 | 6/2002 | Hanrahan et al. |
| 6,400,526 B2 | 6/2002 | Crue, Jr. et al. |
| 6,404,600 B1 | 6/2002 | Hawwa et al. |
| 6,404,601 B1 | 6/2002 | Rottmayer et al. |
| 6,404,706 B1 | 6/2002 | Stovall et al. |
| 6,410,170 B1 | 6/2002 | Chen et al. |
| 6,411,522 B1 | 6/2002 | Frank, Jr. et al. |
| 6,417,998 B1 | 7/2002 | Crue, Jr. et al. |
| 6,417,999 B1 | 7/2002 | Knapp et al. |
| 6,418,000 B1 | 7/2002 | Gibbons et al. |
| 6,418,048 B1 | 7/2002 | Sin et al. |
| 6,421,211 B1 | 7/2002 | Hawwa et al. |
| 6,421,212 B1 | 7/2002 | Gibbons et al. |
| 6,424,505 B1 | 7/2002 | Lam et al. |
| 6,424,507 B1 | 7/2002 | Lederman et al. |
| 6,430,009 B1 | 8/2002 | Komaki et al. |
| 6,430,806 B1 | 8/2002 | Chen et al. |
| 6,433,965 B1 | 8/2002 | Gopinathan et al. |
| 6,433,968 B1 | 8/2002 | Shi et al. |
| 6,433,970 B1 | 8/2002 | Knapp et al. |
| 6,437,945 B1 | 8/2002 | Hawwa et al. |
| 6,445,536 B1 | 9/2002 | Rudy et al. |
| 6,445,542 B1 | 9/2002 | Levi et al. |
| 6,445,553 B2 | 9/2002 | Barr et al. |
| 6,445,554 B1 | 9/2002 | Dong et al. |
| 6,447,935 B1 | 9/2002 | Zhang et al. |
| 6,448,765 B1 | 9/2002 | Chen et al. |
| 6,451,514 B1 | 9/2002 | Iitsuka |
| 6,452,742 B1 | 9/2002 | Crue et al. |
| 6,452,765 B1 | 9/2002 | Mahvan et al. |
| 6,456,465 B1 | 9/2002 | Louis et al. |
| 6,459,552 B1 | 10/2002 | Liu et al. |
| 6,462,920 B1 | 10/2002 | Karimi |
| 6,466,401 B1 | 10/2002 | Hong et al. |
| 6,466,402 B1 | 10/2002 | Crue, Jr. et al. |
| 6,466,404 B1 | 10/2002 | Crue, Jr. et al. |
| 6,468,436 B1 | 10/2002 | Shi et al. |
| 6,469,877 B1 | 10/2002 | Knapp et al. |
| 6,477,019 B2 | 11/2002 | Matono et al. |
| 6,479,096 B1 | 11/2002 | Shi et al. |
| 6,483,662 B1 | 11/2002 | Thomas et al. |
| 6,487,040 B1 | 11/2002 | Hsiao et al. |
| 6,487,056 B1 | 11/2002 | Gibbons et al. |
| 6,490,125 B1 | 12/2002 | Barr |
| 6,496,330 B1 | 12/2002 | Crue, Jr. et al. |
| 6,496,334 B1 | 12/2002 | Pang et al. |
| 6,504,676 B1 | 1/2003 | Hiner et al. |
| 6,512,657 B2 | 1/2003 | Heist et al. |
| 6,512,659 B1 | 1/2003 | Hawwa et al. |
| 6,512,661 B1 | 1/2003 | Louis |
| 6,512,690 B1 | 1/2003 | Qi et al. |
| 6,515,573 B1 | 2/2003 | Dong et al. |
| 6,515,791 B1 | 2/2003 | Hawwa et al. |
| 6,532,823 B1 | 3/2003 | Knapp et al. |
| 6,535,363 B1 | 3/2003 | Hosomi et al. |
| 6,552,874 B1 | 4/2003 | Chen et al. |
| 6,552,928 B1 | 4/2003 | Qi et al. |
| 6,577,470 B1 | 6/2003 | Rumpler |
| 6,583,961 B2 | 6/2003 | Levi et al. |
| 6,583,968 B1 | 6/2003 | Scura et al. |
| 6,597,548 B1 | 7/2003 | Yamanaka et al. |
| 6,611,398 B1 | 8/2003 | Rumpler et al. |
| 6,618,223 B1 | 9/2003 | Chen et al. |
| 6,629,357 B1 | 10/2003 | Akoh |
| 6,633,464 B2 | 10/2003 | Lai et al. |
| 6,636,394 B1 | 10/2003 | Fukagawa et al. |
| 6,639,291 B1 | 10/2003 | Sin et al. |
| 6,650,503 B1 | 11/2003 | Chen et al. |
| 6,650,506 B1 | 11/2003 | Risse |
| 6,654,195 B1 | 11/2003 | Frank, Jr. et al. |
| 6,657,816 B1 | 12/2003 | Barr et al. |
| 6,661,621 B1 | 12/2003 | Iitsuka |

(56) References Cited

U.S. PATENT DOCUMENTS

| | | |
|---|---|---|
| 6,661,625 B1 | 12/2003 | Sin et al. |
| 6,674,610 B1 | 1/2004 | Thomas et al. |
| 6,680,863 B1 | 1/2004 | Shi et al. |
| 6,683,763 B1 | 1/2004 | Hiner et al. |
| 6,687,098 B1 | 2/2004 | Huai |
| 6,687,178 B1 | 2/2004 | Qi et al. |
| 6,687,977 B2 | 2/2004 | Knapp et al. |
| 6,691,226 B1 | 2/2004 | Frank, Jr. et al. |
| 6,697,294 B1 | 2/2004 | Qi et al. |
| 6,700,738 B1 | 3/2004 | Sin et al. |
| 6,700,759 B1 | 3/2004 | Knapp et al. |
| 6,704,158 B2 | 3/2004 | Hawwa et al. |
| 6,707,083 B1 | 3/2004 | Hiner et al. |
| 6,713,801 B1 | 3/2004 | Sin et al. |
| 6,721,138 B1 | 4/2004 | Chen et al. |
| 6,721,149 B1 | 4/2004 | Shi et al. |
| 6,721,203 B1 | 4/2004 | Qi et al. |
| 6,724,569 B1 | 4/2004 | Chen et al. |
| 6,724,572 B1 | 4/2004 | Stoev et al. |
| 6,729,015 B2 | 5/2004 | Matono et al. |
| 6,735,850 B1 | 5/2004 | Gibbons et al. |
| 6,737,281 B1 | 5/2004 | Dang et al. |
| 6,744,608 B1 | 6/2004 | Sin et al. |
| 6,747,301 B1 | 6/2004 | Hiner et al. |
| 6,751,055 B1 | 6/2004 | Alfoqaha et al. |
| 6,754,049 B1 | 6/2004 | Seagle et al. |
| 6,756,071 B1 | 6/2004 | Shi et al. |
| 6,757,140 B1 | 6/2004 | Hawwa |
| 6,760,196 B1 | 7/2004 | Niu et al. |
| 6,762,910 B1 | 7/2004 | Knapp et al. |
| 6,765,756 B1 | 7/2004 | Hong et al. |
| 6,775,902 B1 | 8/2004 | Huai et al. |
| 6,778,358 B1 | 8/2004 | Jiang et al. |
| 6,781,927 B1 | 8/2004 | Heanuc et al. |
| 6,785,955 B1 | 9/2004 | Chen et al. |
| 6,791,793 B1 | 9/2004 | Chen et al. |
| 6,791,807 B1 | 9/2004 | Hikami et al. |
| 6,798,616 B1 | 9/2004 | Seagle et al. |
| 6,798,625 B1 | 9/2004 | Ueno et al. |
| 6,801,408 B1 | 10/2004 | Chen et al. |
| 6,801,411 B1 | 10/2004 | Lederman et al. |
| 6,803,615 B1 | 10/2004 | Sin et al. |
| 6,806,035 B1 | 10/2004 | Atireklapvarodom et al. |
| 6,807,030 B1 | 10/2004 | Hawwa et al. |
| 6,807,332 B1 | 10/2004 | Hawwa |
| 6,809,899 B1 | 10/2004 | Chen et al. |
| 6,816,345 B1 | 11/2004 | Knapp et al. |
| 6,828,897 B1 | 12/2004 | Nepela |
| 6,829,160 B1 | 12/2004 | Qi et al. |
| 6,829,819 B1 | 12/2004 | Crue, Jr. et al. |
| 6,833,979 B1 | 12/2004 | Knapp et al. |
| 6,834,010 B1 | 12/2004 | Qi et al. |
| 6,859,343 B1 | 2/2005 | Alfoqaha et al. |
| 6,859,997 B1 | 3/2005 | Tong et al. |
| 6,861,937 B1 | 3/2005 | Feng et al. |
| 6,870,712 B2 | 3/2005 | Chen et al. |
| 6,873,494 B2 | 3/2005 | Chen et al. |
| 6,873,547 B1 | 3/2005 | Shi et al. |
| 6,879,464 B2 | 4/2005 | Sun et al. |
| 6,888,184 B1 | 5/2005 | Shi et al. |
| 6,888,704 B1 | 5/2005 | Diao et al. |
| 6,891,702 B1 | 5/2005 | Tang |
| 6,894,871 B2 | 5/2005 | Alfoqaha et al. |
| 6,894,877 B1 | 5/2005 | Crue, Jr. et al. |
| 6,906,894 B2 | 6/2005 | Chen et al. |
| 6,909,578 B1 | 6/2005 | Missell et al. |
| 6,912,106 B1 | 6/2005 | Chen et al. |
| 6,934,113 B1 | 8/2005 | Chen |
| 6,934,129 B1 | 8/2005 | Zhang et al. |
| 6,940,688 B2 | 9/2005 | Jiang et al. |
| 6,942,824 B1 | 9/2005 | Li |
| 6,943,993 B2 | 9/2005 | Chang et al. |
| 6,944,938 B1 | 9/2005 | Crue, Jr. et al. |
| 6,947,258 B1 | 9/2005 | Li |
| 6,950,266 B1 | 9/2005 | McCaslin et al. |
| 6,954,332 B1 | 10/2005 | Hong et al. |
| 6,958,885 B1 | 10/2005 | Chen et al. |
| 6,961,221 B1 | 11/2005 | Niu et al. |
| 6,969,989 B1 | 11/2005 | Mei |
| 6,975,486 B2 | 12/2005 | Chen et al. |
| 6,987,643 B1 | 1/2006 | Seagle |
| 6,989,962 B1 | 1/2006 | Dong et al. |
| 6,989,972 B1 | 1/2006 | Stoev et al. |
| 7,006,327 B2 | 2/2006 | Krounbi et al. |
| 7,007,372 B1 | 3/2006 | Chen et al. |
| 7,012,832 B1 | 3/2006 | Sin et al. |
| 7,023,658 B1 | 4/2006 | Knapp et al. |
| 7,026,063 B2 | 4/2006 | Ueno et al. |
| 7,027,268 B1 | 4/2006 | Zhu et al. |
| 7,027,274 B1 | 4/2006 | Sin et al. |
| 7,035,046 B1 | 4/2006 | Young et al. |
| 7,041,985 B1 | 5/2006 | Wang et al. |
| 7,046,490 B1 | 5/2006 | Ueno et al. |
| 7,054,113 B1 | 5/2006 | Seagle et al. |
| 7,057,857 B1 | 6/2006 | Niu et al. |
| 7,059,868 B1 | 6/2006 | Yan |
| 7,092,195 B1 | 8/2006 | Liu et al. |
| 7,110,289 B1 | 9/2006 | Sin et al. |
| 7,111,382 B1 | 9/2006 | Knapp et al. |
| 7,113,366 B1 | 9/2006 | Wang et al. |
| 7,114,241 B2 | 10/2006 | Kubota et al. |
| 7,116,517 B1 | 10/2006 | He et al. |
| 7,124,654 B1 | 10/2006 | Davies et al. |
| 7,126,788 B1 | 10/2006 | Liu et al. |
| 7,126,790 B1 | 10/2006 | Liu et al. |
| 7,131,346 B1 | 11/2006 | Buttar et al. |
| 7,133,253 B1 | 11/2006 | Seagle et al. |
| 7,134,185 B1 | 11/2006 | Knapp et al. |
| 7,154,715 B2 | 12/2006 | Yamanaka et al. |
| 7,170,725 B1 | 1/2007 | Zhou et al. |
| 7,177,117 B1 | 2/2007 | Jiang et al. |
| 7,193,815 B1 | 3/2007 | Stoev et al. |
| 7,196,880 B1 | 3/2007 | Anderson et al. |
| 7,199,974 B1 | 4/2007 | Alfoqaha |
| 7,199,975 B1 | 4/2007 | Pan |
| 7,211,339 B1 | 5/2007 | Seagle et al. |
| 7,212,384 B1 | 5/2007 | Stoev et al. |
| 7,238,292 B1 | 7/2007 | He et al. |
| 7,239,478 B1 | 7/2007 | Sin et al. |
| 7,248,431 B1 | 7/2007 | Liu et al. |
| 7,248,433 B1 | 7/2007 | Stoev et al. |
| 7,248,449 B1 | 7/2007 | Seagle |
| 7,280,325 B1 | 10/2007 | Pan |
| 7,283,327 B1 | 10/2007 | Liu et al. |
| 7,284,316 B1 | 10/2007 | Huai et al. |
| 7,286,329 B1 | 10/2007 | Chen et al. |
| 7,289,303 B1 | 10/2007 | Sin et al. |
| 7,292,409 B1 | 11/2007 | Stoev et al. |
| 7,296,339 B1 | 11/2007 | Yang et al. |
| 7,307,814 B1 | 12/2007 | Seagle et al. |
| 7,307,818 B1 | 12/2007 | Park et al. |
| 7,310,204 B1 | 12/2007 | Stoev et al. |
| 7,318,947 B1 | 1/2008 | Park et al. |
| 7,333,295 B1 | 2/2008 | Medina et al. |
| 7,337,530 B1 | 3/2008 | Stoev et al. |
| 7,342,752 B1 | 3/2008 | Zhang et al. |
| 7,349,170 B1 | 3/2008 | Rudman et al. |
| 7,349,179 B1 | 3/2008 | He et al. |
| 7,354,664 B1 | 4/2008 | Jiang et al. |
| 7,363,697 B1 | 4/2008 | Dunn et al. |
| 7,371,152 B1 | 5/2008 | Newman |
| 7,372,665 B1 | 5/2008 | Stoev et al. |
| 7,375,926 B1 | 5/2008 | Stoev et al. |
| 7,379,269 B1 | 5/2008 | Krounbi et al. |
| 7,386,933 B1 | 6/2008 | Krounbi et al. |
| 7,389,577 B1 | 6/2008 | Shang et al. |
| 7,417,832 B1 | 8/2008 | Erickson et al. |
| 7,419,891 B1 | 9/2008 | Chen et al. |
| 7,428,124 B1 | 9/2008 | Song et al. |
| 7,430,098 B1 | 9/2008 | Song et al. |
| 7,436,620 B1 | 10/2008 | Kang et al. |
| 7,436,638 B1 | 10/2008 | Pan |
| 7,440,220 B1 | 10/2008 | Kang et al. |
| 7,443,632 B1 | 10/2008 | Stoev et al. |

(56) References Cited

U.S. PATENT DOCUMENTS

| | | |
|---|---|---|
| 7,444,740 B1 | 11/2008 | Chung et al. |
| 7,493,688 B1 | 2/2009 | Wang et al. |
| 7,508,627 B1 | 3/2009 | Zhang et al. |
| 7,522,377 B1 | 4/2009 | Jiang et al. |
| 7,522,379 B1 | 4/2009 | Krounbi et al. |
| 7,522,382 B1 | 4/2009 | Pan |
| 7,542,246 B1 | 6/2009 | Song et al. |
| 7,551,406 B1 | 6/2009 | Thomas et al. |
| 7,552,523 B1 | 6/2009 | He et al. |
| 7,554,767 B1 | 6/2009 | Hu et al. |
| 7,583,466 B2 | 9/2009 | Kermiche et al. |
| 7,595,967 B1 | 9/2009 | Moon et al. |
| 7,639,457 B1 | 12/2009 | Chen et al. |
| 7,660,080 B1 | 2/2010 | Liu et al. |
| 7,672,080 B1 | 3/2010 | Tang et al. |
| 7,672,086 B1 | 3/2010 | Jiang |
| 7,684,160 B1 | 3/2010 | Erickson et al. |
| 7,688,546 B1 | 3/2010 | Bai et al. |
| 7,691,434 B1 | 4/2010 | Zhang et al. |
| 7,695,761 B1 | 4/2010 | Shen et al. |
| 7,719,795 B2 | 5/2010 | Hu et al. |
| 7,726,009 B1 | 6/2010 | Liu et al. |
| 7,729,086 B1 | 6/2010 | Song et al. |
| 7,729,087 B1 | 6/2010 | Stoev et al. |
| 7,736,823 B1 | 6/2010 | Wang et al. |
| 7,785,666 B1 | 8/2010 | Sun et al. |
| 7,796,356 B1 | 9/2010 | Fowler et al. |
| 7,800,858 B1 | 9/2010 | Bajikar et al. |
| 7,819,979 B1 | 10/2010 | Chen et al. |
| 7,829,264 B1 | 11/2010 | Wang et al. |
| 7,846,643 B1 | 12/2010 | Sun et al. |
| 7,855,854 B2 | 12/2010 | Hu et al. |
| 7,869,160 B1 | 1/2011 | Pan et al. |
| 7,872,824 B1 | 1/2011 | Macchioni et al. |
| 7,872,833 B2 | 1/2011 | Hu et al. |
| 7,910,267 B1 | 3/2011 | Zeng et al. |
| 7,911,735 B1 | 3/2011 | Sin et al. |
| 7,911,737 B1 | 3/2011 | Jiang et al. |
| 7,916,426 B2 | 3/2011 | Hu et al. |
| 7,918,013 B1 | 4/2011 | Dunn et al. |
| 7,968,219 B1 | 6/2011 | Jiang et al. |
| 7,982,989 B1 | 7/2011 | Shi et al. |
| 8,008,912 B1 | 8/2011 | Shang |
| 8,012,804 B1 | 9/2011 | Wang et al. |
| 8,015,692 B1 | 9/2011 | Zhang et al. |
| 8,018,677 B1 | 9/2011 | Chung et al. |
| 8,018,678 B1 | 9/2011 | Zhang et al. |
| 8,024,748 B1 | 9/2011 | Moravec et al. |
| 8,072,705 B1 | 12/2011 | Wang et al. |
| 8,074,345 B1 | 12/2011 | Anguelouch et al. |
| 8,077,418 B1 | 12/2011 | Hu et al. |
| 8,077,434 B1 | 12/2011 | Shen et al. |
| 8,077,435 B1 | 12/2011 | Liu et al. |
| 8,077,557 B1 | 12/2011 | Hu et al. |
| 8,079,135 B1 | 12/2011 | Shen et al. |
| 8,081,403 B1 | 12/2011 | Chen et al. |
| 8,091,210 B1 | 1/2012 | Sasaki et al. |
| 8,097,846 B1 | 1/2012 | Anguelouch et al. |
| 8,104,166 B1 | 1/2012 | Zhang et al. |
| 8,116,043 B2 | 2/2012 | Leng et al. |
| 8,116,171 B1 | 2/2012 | Lee |
| 8,125,732 B2 | 2/2012 | Bai et al. |
| 8,125,856 B1 | 2/2012 | Li et al. |
| 8,134,794 B1 | 3/2012 | Wang |
| 8,136,224 B1 | 3/2012 | Sun et al. |
| 8,136,225 B1 | 3/2012 | Zhang et al. |
| 8,136,805 B1 | 3/2012 | Lee |
| 8,141,235 B1 | 3/2012 | Zhang |
| 8,146,236 B1 | 4/2012 | Luo et al. |
| 8,149,536 B1 | 4/2012 | Yang et al. |
| 8,151,441 B1 | 4/2012 | Rudy et al. |
| 8,163,185 B1 | 4/2012 | Sun et al. |
| 8,164,760 B2 | 4/2012 | Willis |
| 8,164,855 B1 | 4/2012 | Gibbons et al. |
| 8,164,864 B2 | 4/2012 | Kaiser et al. |
| 8,165,709 B1 | 4/2012 | Rudy |
| 8,166,631 B1 * | 5/2012 | Tran et al. ............ 29/603.14 |
| 8,166,632 B1 | 5/2012 | Zhang et al. |
| 8,169,473 B1 | 5/2012 | Yu et al. |
| 8,171,618 B1 | 5/2012 | Wang et al. |
| 8,179,636 B1 | 5/2012 | Bai et al. |
| 8,191,237 B1 | 6/2012 | Luo et al. |
| 8,194,365 B1 | 6/2012 | Leng et al. |
| 8,194,366 B1 | 6/2012 | Li et al. |
| 8,196,285 B1 | 6/2012 | Zhang et al. |
| 8,200,054 B1 | 6/2012 | Li et al. |
| 8,203,800 B2 | 6/2012 | Li et al. |
| 8,208,350 B1 | 6/2012 | Hu et al. |
| 8,220,140 B1 | 7/2012 | Wang et al. |
| 8,222,599 B1 | 7/2012 | Chien |
| 8,225,488 B1 | 7/2012 | Zhang et al. |
| 8,227,023 B1 | 7/2012 | Liu et al. |
| 8,228,633 B1 | 7/2012 | Tran et al. |
| 8,231,796 B1 | 7/2012 | Li et al. |
| 8,233,248 B1 | 7/2012 | Li et al. |
| 8,248,896 B1 | 8/2012 | Yuan et al. |
| 8,254,060 B1 | 8/2012 | Shi et al. |
| 8,257,597 B1 | 9/2012 | Guan et al. |
| 8,259,410 B1 | 9/2012 | Bai et al. |
| 8,259,539 B1 | 9/2012 | Hu et al. |
| 8,262,918 B1 | 9/2012 | Li et al. |
| 8,262,919 B1 | 9/2012 | Luo et al. |
| 8,264,797 B2 | 9/2012 | Emley |
| 8,264,798 B1 | 9/2012 | Guan et al. |
| 8,270,126 B1 | 9/2012 | Roy et al. |
| 8,276,258 B1 | 10/2012 | Tran et al. |
| 8,277,669 B1 | 10/2012 | Chen et al. |
| 8,279,719 B1 | 10/2012 | Hu et al. |
| 8,284,517 B1 | 10/2012 | Sun et al. |
| 8,288,204 B1 | 10/2012 | Wang et al. |
| 8,289,821 B1 | 10/2012 | Huber |
| 8,291,743 B1 | 10/2012 | Shi et al. |
| 8,307,539 B1 | 11/2012 | Rudy et al. |
| 8,307,540 B1 | 11/2012 | Tran et al. |
| 8,308,921 B1 | 11/2012 | Hiner et al. |
| 8,310,785 B1 | 11/2012 | Zhang et al. |
| 8,310,901 B1 | 11/2012 | Batra et al. |
| 8,315,019 B1 | 11/2012 | Mao et al. |
| 8,316,527 B2 | 11/2012 | Hong et al. |
| 8,320,076 B1 | 11/2012 | Shen et al. |
| 8,320,077 B1 | 11/2012 | Tang et al. |
| 8,320,219 B1 | 11/2012 | Wolf et al. |
| 8,320,220 B1 | 11/2012 | Yuan et al. |
| 8,320,722 B1 | 11/2012 | Yuan et al. |
| 8,322,022 B1 | 12/2012 | Yi et al. |
| 8,322,023 B1 | 12/2012 | Zeng et al. |
| 8,325,569 B1 | 12/2012 | Shi et al. |
| 8,333,008 B1 | 12/2012 | Sin et al. |
| 8,334,093 B2 | 12/2012 | Zhang et al. |
| 8,336,194 B2 | 12/2012 | Yuan et al. |
| 8,339,738 B1 | 12/2012 | Tran et al. |
| 8,341,826 B1 | 1/2013 | Jiang et al. |
| 8,343,319 B1 | 1/2013 | Li et al. |
| 8,343,364 B1 | 1/2013 | Gao et al. |
| 8,349,195 B1 | 1/2013 | Si et al. |
| 8,351,307 B1 | 1/2013 | Wolf et al. |
| 8,357,244 B1 | 1/2013 | Zhao et al. |
| 8,373,945 B1 | 2/2013 | Luo et al. |
| 8,375,564 B1 | 2/2013 | Luo et al. |
| 8,375,565 B2 | 2/2013 | Hu et al. |
| 8,381,391 B2 | 2/2013 | Park et al. |
| 8,385,157 B1 | 2/2013 | Champion et al. |
| 8,385,158 B1 | 2/2013 | Hu et al. |
| 8,394,280 B1 | 3/2013 | Wan et al. |
| 8,400,731 B1 | 3/2013 | Li et al. |
| 8,404,128 B1 | 3/2013 | Zhang et al. |
| 8,404,129 B1 | 3/2013 | Luo et al. |
| 8,405,930 B1 | 3/2013 | Li et al. |
| 8,409,453 B1 | 4/2013 | Jiang et al. |
| 8,413,317 B1 | 4/2013 | Wan et al. |
| 8,416,540 B1 | 4/2013 | Li et al. |
| 8,419,953 B1 | 4/2013 | Su et al. |
| 8,419,954 B1 * | 4/2013 | Chen et al. ............ 216/22 |
| 8,422,176 B1 | 4/2013 | Leng et al. |

(56) References Cited

U.S. PATENT DOCUMENTS

| | | | |
|---|---|---|---|
| 8,422,342 B1 | 4/2013 | Lee | |
| 8,422,841 B1 | 4/2013 | Shi et al. | |
| 8,424,192 B1 | 4/2013 | Yang et al. | |
| 8,441,756 B1 | 5/2013 | Sun et al. | |
| 8,443,510 B1 | 5/2013 | Shi et al. | |
| 8,444,866 B1 | 5/2013 | Guan et al. | |
| 8,449,948 B2 | 5/2013 | Medina et al. | |
| 8,451,556 B1 | 5/2013 | Wang et al. | |
| 8,451,563 B1 | 5/2013 | Zhang et al. | |
| 8,454,846 B1* | 6/2013 | Zhou et al. | 216/22 |
| 8,455,119 B1 | 6/2013 | Jiang et al. | |
| 8,456,961 B1 | 6/2013 | Wang et al. | |
| 8,456,963 B1 | 6/2013 | Hu et al. | |
| 8,456,964 B1 | 6/2013 | Yuan et al. | |
| 8,456,966 B1 | 6/2013 | Shi et al. | |
| 8,456,967 B1 | 6/2013 | Mallary | |
| 8,458,892 B2 | 6/2013 | Si et al. | |
| 8,462,592 B1 | 6/2013 | Wolf et al. | |
| 8,468,682 B1 | 6/2013 | Zhang | |
| 8,472,288 B1 | 6/2013 | Wolf et al. | |
| 8,480,911 B1 | 7/2013 | Osugi et al. | |
| 8,486,285 B2 | 7/2013 | Zhou et al. | |
| 8,486,286 B1 | 7/2013 | Gao et al. | |
| 8,488,272 B1 | 7/2013 | Tran et al. | |
| 8,491,801 B1 | 7/2013 | Tanner et al. | |
| 8,491,802 B1 | 7/2013 | Gao et al. | |
| 8,493,693 B1 | 7/2013 | Zheng et al. | |
| 8,493,695 B1 | 7/2013 | Kaiser et al. | |
| 8,495,813 B1 | 7/2013 | Hu et al. | |
| 8,498,084 B1 | 7/2013 | Leng et al. | |
| 8,506,828 B1 | 8/2013 | Osugi et al. | |
| 8,514,517 B1 | 8/2013 | Batra et al. | |
| 8,518,279 B1 | 8/2013 | Wang et al. | |
| 8,518,832 B1 | 8/2013 | Yang et al. | |
| 8,520,336 B1 | 8/2013 | Liu et al. | |
| 8,520,337 B1 | 8/2013 | Liu et al. | |
| 8,524,068 B2 | 9/2013 | Medina et al. | |
| 8,526,275 B1 | 9/2013 | Yuan et al. | |
| 8,531,801 B1 | 9/2013 | Xiao et al. | |
| 8,532,450 B1 | 9/2013 | Wang et al. | |
| 8,533,937 B1 | 9/2013 | Wang et al. | |
| 8,537,494 B1 | 9/2013 | Pan et al. | |
| 8,537,495 B1 | 9/2013 | Luo et al. | |
| 8,537,502 B1 | 9/2013 | Park et al. | |
| 8,545,999 B1 | 10/2013 | Leng et al. | |
| 8,547,659 B1 | 10/2013 | Bai et al. | |
| 8,547,667 B1 | 10/2013 | Roy et al. | |
| 8,547,730 B1 | 10/2013 | Shen et al. | |
| 8,555,486 B1 | 10/2013 | Medina et al. | |
| 8,559,141 B1 | 10/2013 | Pakala et al. | |
| 8,563,146 B1 | 10/2013 | Zhang et al. | |
| 8,565,049 B1 | 10/2013 | Tanner et al. | |
| 8,576,517 B1 | 11/2013 | Tran et al. | |
| 8,578,594 B2 | 11/2013 | Jiang et al. | |
| 8,582,238 B1 | 11/2013 | Liu et al. | |
| 8,582,241 B1 | 11/2013 | Yu et al. | |
| 8,582,253 B1 | 11/2013 | Zheng et al. | |
| 8,588,039 B1 | 11/2013 | Shi et al. | |
| 8,593,914 B2 | 11/2013 | Wang et al. | |
| 8,597,528 B1 | 12/2013 | Roy et al. | |
| 8,599,520 B1 | 12/2013 | Liu et al. | |
| 8,599,657 B1 | 12/2013 | Lee | |
| 8,603,593 B1 | 12/2013 | Roy et al. | |
| 8,607,438 B1 | 12/2013 | Gao et al. | |
| 8,607,439 B1 | 12/2013 | Wang et al. | |
| 8,611,035 B1 | 12/2013 | Bajikar et al. | |
| 8,611,054 B1 | 12/2013 | Shang et al. | |
| 8,611,055 B1 | 12/2013 | Pakala et al. | |
| 8,614,864 B1 | 12/2013 | Hong et al. | |
| 8,619,512 B1 | 12/2013 | Yuan et al. | |
| 8,625,233 B1 | 1/2014 | Ji et al. | |
| 8,625,941 B1 | 1/2014 | Shi et al. | |
| 8,628,672 B1 | 1/2014 | Si et al. | |
| 8,630,068 B1 | 1/2014 | Mauri et al. | |
| 8,634,280 B1 | 1/2014 | Wang et al. | |
| 8,638,529 B1 | 1/2014 | Leng et al. | |
| 8,643,980 B1 | 2/2014 | Fowler et al. | |
| 8,649,123 B1 | 2/2014 | Zhang et al. | |
| 8,665,561 B1 | 3/2014 | Knutson et al. | |
| 8,670,211 B1 | 3/2014 | Sun et al. | |
| 8,670,213 B1 | 3/2014 | Zeng et al. | |
| 8,670,214 B1 | 3/2014 | Knutson et al. | |
| 8,670,294 B1 | 3/2014 | Shi et al. | |
| 8,670,295 B1 | 3/2014 | Hu et al. | |
| 8,675,318 B1 | 3/2014 | Ho et al. | |
| 8,675,455 B1 | 3/2014 | Krichevsky et al. | |
| 8,681,594 B1 | 3/2014 | Shi et al. | |
| 8,689,430 B1 | 4/2014 | Chen et al. | |
| 8,693,141 B1 | 4/2014 | Elliott et al. | |
| 8,703,397 B1 | 4/2014 | Zeng et al. | |
| 8,705,205 B1 | 4/2014 | Li et al. | |
| 8,711,518 B1 | 4/2014 | Zeng et al. | |
| 8,711,528 B1 | 4/2014 | Xiao et al. | |
| 8,717,709 B1 | 5/2014 | Shi et al. | |
| 8,720,044 B1* | 5/2014 | Tran | G11B 5/315 29/603.11 |
| 8,721,902 B1 | 5/2014 | Wang et al. | |
| 8,724,259 B1* | 5/2014 | Liu | G11B 5/1278 360/125.15 |
| 8,749,790 B1 | 6/2014 | Tanner et al. | |
| 8,749,920 B1 | 6/2014 | Knutson et al. | |
| 8,753,903 B1 | 6/2014 | Tanner et al. | |
| 8,760,807 B1 | 6/2014 | Zhang et al. | |
| 8,760,818 B1 | 6/2014 | Diao et al. | |
| 8,760,819 B1 | 6/2014 | Liu et al. | |
| 8,760,822 B1 | 6/2014 | Li et al. | |
| 8,760,823 B1 | 6/2014 | Chen et al. | |
| 8,763,235 B1 | 7/2014 | Wang et al. | |
| 8,780,498 B1 | 7/2014 | Jiang et al. | |
| 8,780,505 B1 | 7/2014 | Xiao | |
| 8,786,983 B1 | 7/2014 | Liu et al. | |
| 8,790,524 B1 | 7/2014 | Luo et al. | |
| 8,790,527 B1 | 7/2014 | Luo et al. | |
| 8,792,208 B1* | 7/2014 | Liu | G11B 5/1278 360/125.03 |
| 8,792,312 B1 | 7/2014 | Wang et al. | |
| 8,793,866 B1 | 8/2014 | Zhang et al. | |
| 8,797,680 B1 | 8/2014 | Luo et al. | |
| 8,797,684 B1 | 8/2014 | Tran et al. | |
| 8,797,686 B1 | 8/2014 | Bai et al. | |
| 8,797,692 B1 | 8/2014 | Guo et al. | |
| 8,813,324 B2 | 8/2014 | Emley et al. | |
| 8,980,109 B1* | 3/2015 | Zhou et al. | 216/22 |
| 2006/0002021 A1 | 1/2006 | Li et al. | |
| 2006/0225268 A1 | 10/2006 | Le et al. | |
| 2007/0279802 A1 | 12/2007 | Sasaki et al. | |
| 2008/0081461 A1 | 4/2008 | Lee et al. | |
| 2008/0090418 A1 | 4/2008 | Jeon et al. | |
| 2008/0316644 A1 | 12/2008 | Lee et al. | |
| 2010/0290157 A1 | 11/2010 | Zhang et al. | |
| 2011/0051293 A1 | 3/2011 | Bai et al. | |
| 2011/0086240 A1 | 4/2011 | Xiang et al. | |
| 2012/0050915 A1* | 3/2012 | Hong et al. | 360/123.12 |
| 2012/0111826 A1 | 5/2012 | Chen et al. | |
| 2012/0216378 A1 | 8/2012 | Emley et al. | |
| 2012/0237878 A1 | 9/2012 | Zeng et al. | |
| 2012/0298621 A1 | 11/2012 | Gao | |
| 2013/0216702 A1 | 8/2013 | Kaiser et al. | |
| 2013/0216863 A1 | 8/2013 | Li et al. | |
| 2013/0257421 A1 | 10/2013 | Shang et al. | |
| 2014/0154529 A1 | 6/2014 | Yang et al. | |
| 2014/0175050 A1 | 6/2014 | Zhang et al. | |

OTHER PUBLICATIONS

Jinqiu Zhang, et al., U.S. Appl. No. 13/929,705, filed Jun. 27, 2013, 17 pages.

Jinqiu Zhang, et al., U.S. Appl. No. 14/046,790, filed Oct. 4, 2013, 26 pages.

* cited by examiner

ABS View

Yoke View

Plan View

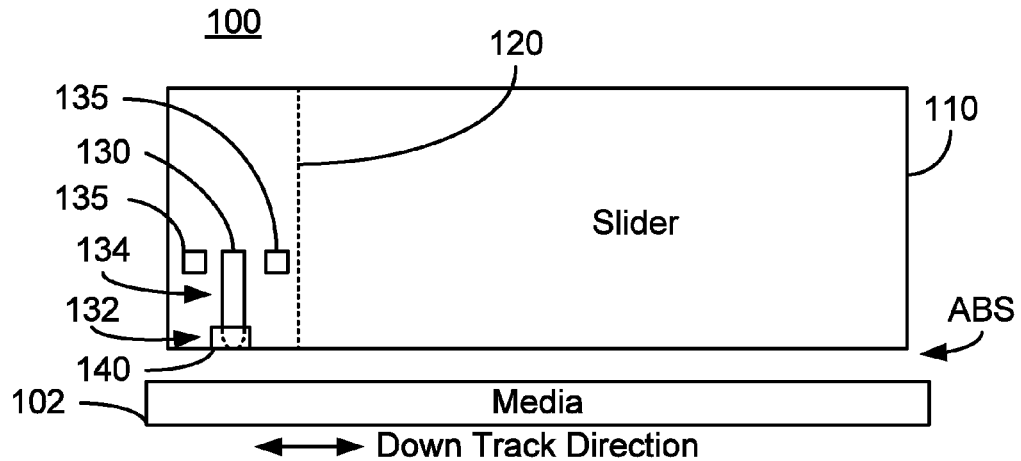
FIG. 2
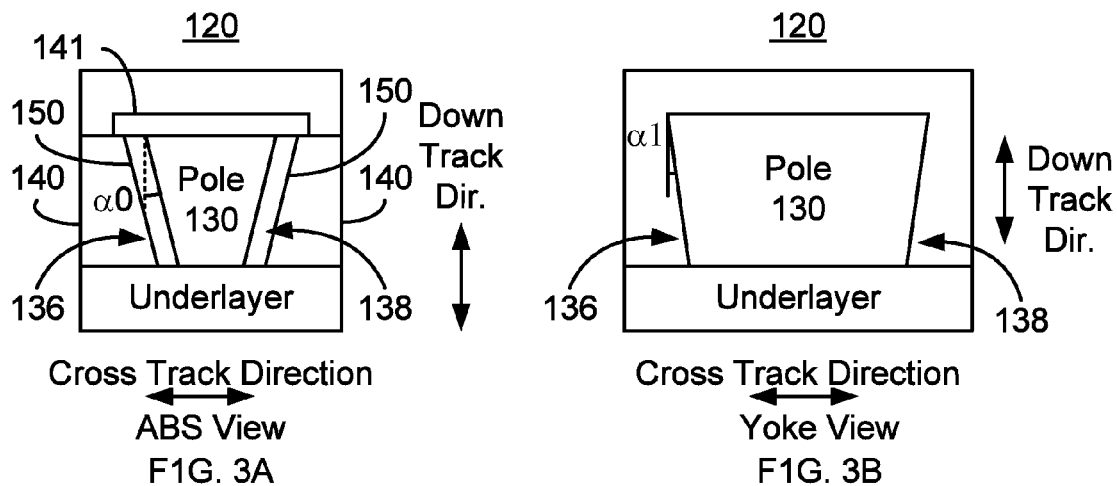
FIG. 3A
FIG. 3B
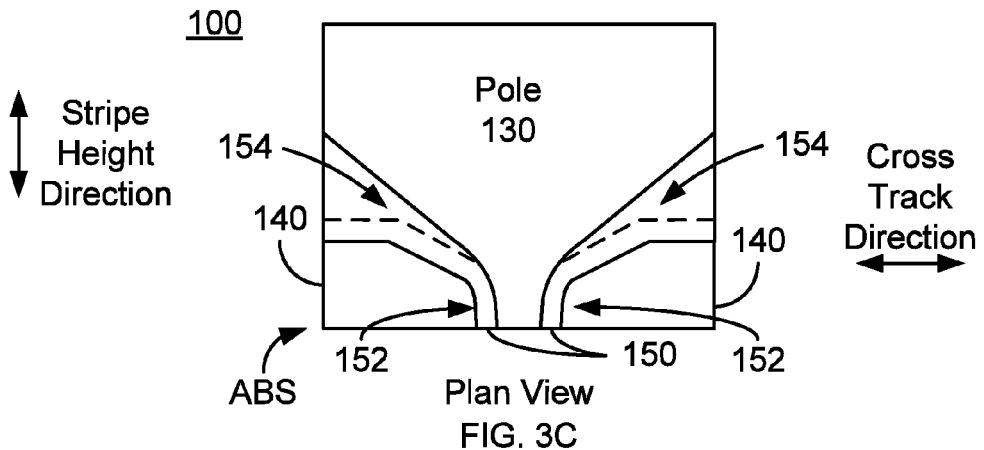
FIG. 3C

ABS View

ABS View

Recessed View

Recessed View

ABS View

ABS View

Recessed View

Recessed View

ABS View

ABS View

Recessed View

Recessed View

ABS View

ABS View

Recessed View

Recessed View

ABS View

ABS View

Recessed View

Recessed View

ABS View

ABS View

Recessed View

Recessed View

ABS View

Recessed View

METHOD FOR FABRICATING A MAGNETIC WRITER HAVING A GRADIENT SIDE GAP

CROSS-REFERENCE TO RELATED APPLICATIONS

This application claims priority to provisional U.S. Patent Application Ser. No. 61/893,101, filed on Oct. 18, 2013, which is hereby incorporated by reference in its entirety.

BACKGROUND

FIGS. 1A, 1B and 1C depict ABS, yoke and plan views of a conventional magnetic recording head 10. The magnetic recording transducer 10 may be a perpendicular magnetic recording (PMR) head. The conventional magnetic recording transducer 10 may be a part of a merged head including the write transducer 10 and a read transducer (not shown). Alternatively, the magnetic recording head may be a write head including only the write transducer 10. The conventional transducer 10 includes an underlayer 12, side gap 14, side shields 16, top gap 17, optional top shield 18 and main pole 20.

The main pole 20 resides on an underlayer 12 and includes sidewalls 22 and 24. The sidewalls 22 and 24 of the conventional main pole 20 form an angle $\alpha 0$ with the down track direction at the ABS and an angle $\alpha 1$ with the down track direction at the distance x1 from the ABS. As can be seen in FIGS. 1A and 1B, portions of the main pole 20 recessed from the ABS in the stripe height direction are wider in the cross track direction than at the ABS. In addition, the angle between the sidewalls 22 and 24 and the down track direction increases. Thus, $\alpha 1$ is greater than $\alpha 0$. For example, if $\alpha 0$ is on the order of 13°, then al may be 25°.

The side shields 16 are separated from the main pole 20 by a side gap 14. The side shields 16 extend a distance back from the ABS. The gap 14 between the side shields 16 and the main pole 20 may have a substantially constant thickness. Thus, the side shields 16 are conformal with the main pole 20.

Although the conventional magnetic recording head 10 functions, there are drawbacks. In particular, the conventional magnetic recording head 10 may not perform sufficiently at higher recording densities. For example, the write field of the conventional main pole 20 may not have a sufficiently high magnitude write field without introducing adjacent track interference (ATI) issues. Accordingly, what is needed is a system and method for improving the performance of a magnetic recording head.

BRIEF DESCRIPTION OF SEVERAL VIEWS OF THE DRAWINGS

FIG. 2 depicts an exemplary embodiment of a magnetic recording disk drive.

FIGS. 3A, 3B and 3C depict ABS, yoke and plan views of an exemplary embodiment of a magnetic recording transducer.

FIGS. 7A and 7B through 16A, 16B and 16C depict various views of an exemplary embodiment of a magnetic recording transducer fabricated using the method.

FIGS. 17A and 17B through 29A, 29B and 29C depict various views of an exemplary embodiment of a magnetic recording transducer fabricated using the method.

DETAILED DESCRIPTION OF THE PREFERRED EMBODIMENTS

Figure 1A:
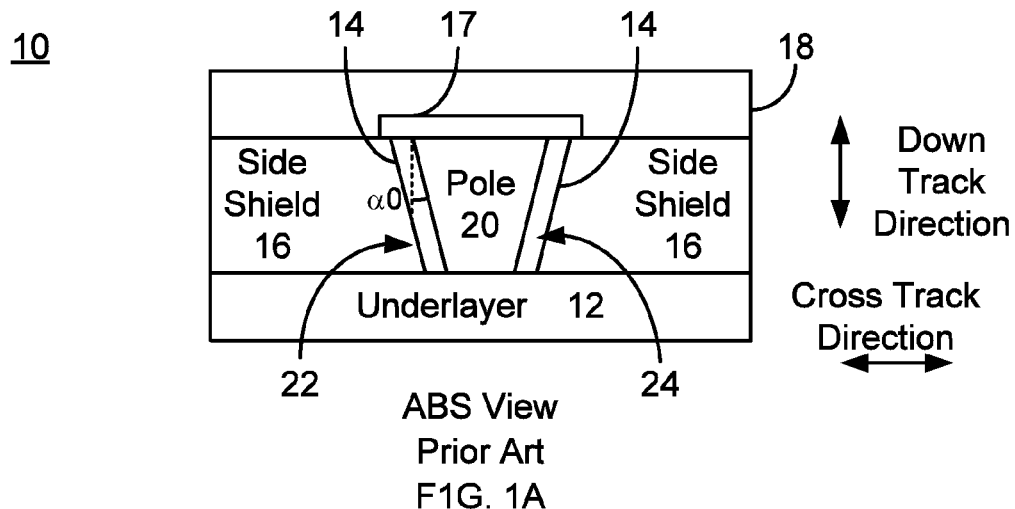
FIGS. 1A-1C depict ABS, yoke and plan views of a conventional magnetic recording head.
Figure 1B:
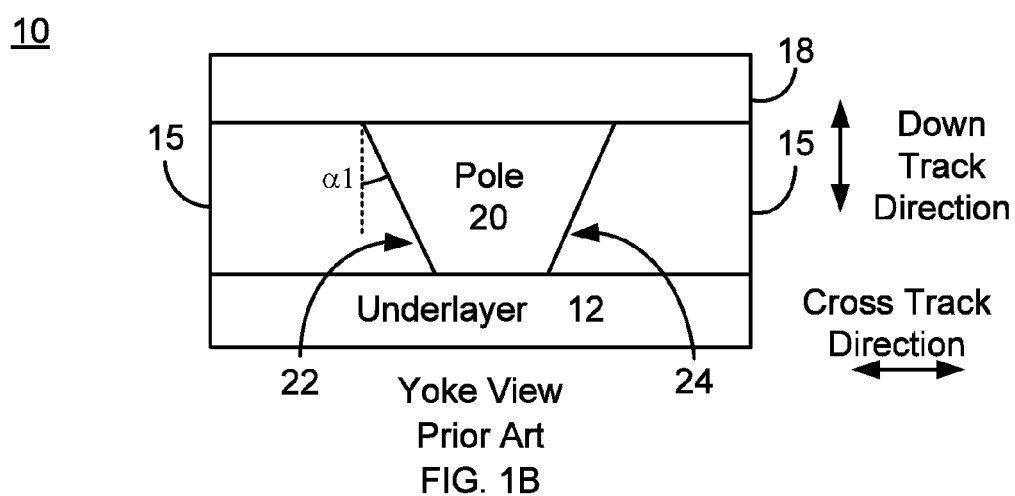
Figure 1C:
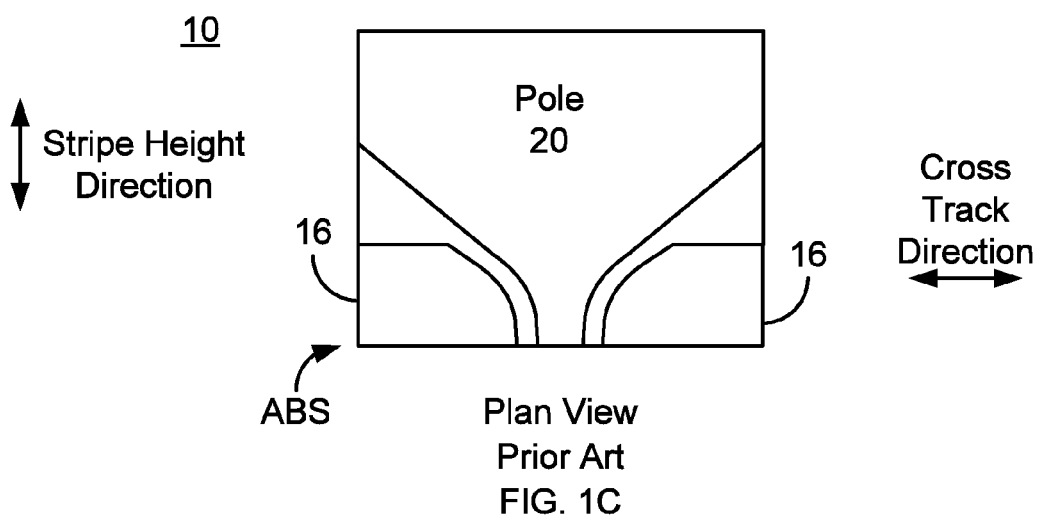

FIG. 2 depicts a side view of an exemplary embodiment of a portion of a disk drive 100 including a write transducer 120. FIGS. 3A, 3B and 3C depict ABS, yoke and plan views of the transducer 120. For clarity, FIGS. 2, 3A, 3B and 3C are not to scale. For simplicity not all portions of the disk drive 100 and transducer 120 are shown. In addition, although the disk drive 100 and transducer 120 are depicted in the context of particular components other and/or different components may be used. For example, circuitry used to drive and control various portions of the disk drive 100 is not shown. For simplicity, only single components 102, 110, 120, 130, 140 and 150 are shown. However, multiples of each components 102, 110, 120, 130, 140, 150 and/or their sub-components, might be used. The disk drive 100 may be a perpendicular magnetic recording (PMR) disk drive. However, in other embodiments, the disk drive 100 may be configured for other types of magnetic recording included but not limited to heat assisted magnetic recording (HAMR).

The disk drive 100 includes media 102, a slider 110 and a write transducer 120. Additional and/or different components may be included in the disk drive 100. Although not shown, the slider 110 and thus the transducer 120 are generally attached to a suspension (not shown). The transducer 120 is fabricated on the slider 110 and includes an air-bearing surface (ABS) proximate to the media 102 during use. In general, the disk drive 100 includes a write transducer 120 and a read transducer (not shown). However, for clarity, only the write transducer 120 is shown. The transducer 120 includes a main pole 130, coils 135, side shields 140, top gap 141 and side gap 150. In other embodiments, different and/or additional components may be used in the write transducer 120.

The coil(s) 135 are used to energize the main pole 130. Two turns 135 are depicted in FIG. 2. Another number of turns may, however, be used. Note that only a portion of the coil(s) 135 is shown in FIG. 2. If, for example, the coil(s) 135 form a helical coil, then additional portion(s) of the coil(s) 135 may be located on the opposite side of the main pole 130 as is shown. If the coil(s) 135 is a spiral, or pancake, coil, then additional portions of the coil(s) 135 may be located further from the ABS. Further, additional coils may also be used.

The main pole 130 includes a pole tip region 132 close to the ABS and a yoke region 134 recessed from the ABS. The pole tip region 132 is shown as having top and bottom bevels 131 and 133, respectively, near the ABS. This portion is shown in FIG. 3A. In addition, the pole tip region 134 includes sidewalls 136 and 138 in the cross track direction. The sidewalls are configured such that the pole 130 has a bottom and a top wider than the bottom.

The sidewalls 136 and 138 form sidewall angles with the down track direction. At the ABS, the sidewall 136 forms sidewall angle $\alpha 0$ with respect to the down track direction. In some embodiments, the sidewalls 136 and 138 are symmetric. Thus, although not labeled, the sidewall 138 would form substantially the same sidewall angle with the down track direction as the sidewall 136. In some embodiments, $\alpha 0$ is not more than fourteen degrees. In some such embodiments, $\alpha 0$ is at least twelve degrees. For example, $\alpha 0$ may be nominally 13.5°. At a distance recessed from the ABS, the sidewall 136 forms sidewall angle α1 with the down track direction. In some embodiments, the sidewall angle α1 is less than α0 at x1. For example, if α0 is 12-14 degrees, then α1 is greater than or equal to zero degrees and not more than 12-14 degrees. In some embodiments, α1 is zero degrees. However, in other embodiments, the sidewall angles may vary in another manner. In some such embodiments, the sidewall angle may increase with increasing distance from the ABS. Further, the manner in which the sidewall angle changes from α0 to α1 may differ in different embodiments. For example, the sidewall angle may remain α0 from the ABS to some distance from the ABS. The sidewall angle may then change to α1 in a manner analogous to a step function. In other embodiments, the sidewall angle may change from α0 to α1 in another manner including but not limited to a linear or piece-wise linear fashion. Further, in the embodiment shown, the sidewall angle remains α1. In other embodiments, additional changes may be present, Also shown are side gaps 150 that separate the main pole 130 from the side shields 140. As can best be seen in FIG. 3C, the side gaps 150 have a conformal region 152 and a nonconformal region 154. Thus, the width of the side gap 150 in the cross track direction changes in the nonconformal region 154. Stated differently, because the distance between the pole 130 and the side shields 140 changes in the nonconformal region 154, the side gap 150 has a gradient in width. This gradient side gap 150 may also be made of multiple materials. Thus, a dashed line indicates the layer forming the conformal region 152 and part of the nonconformal region 154. The remainder of the nonconformal region 154 may be formed by other materials. For example, the conformal region 152 may be formed by Ru and/or Ta seed layers. However, the remainder of the nonconformal region 154 (between the dashed line and the main pole 130) may be formed from a material such as aluminum oxide. In other embodiments, the conformal region 152 and nonconformal region 154 of the side gap 150 may be formed of the same material. In some embodiments, the conformal region 152 extends not more than four hundred nanometers from the ABS. In some embodiments, the conformal region 152 extends not more than two hundred nanometers and at least ten nanometers from the ABS. In other embodiments, the conformal region 152 extends at least eighty and not more than one hundred and twenty nanometers from the ABS.

The magnetic disk drive 100 may exhibit improved performance. The gradient in width of the side gap 150 in the conformal region 154 allows less of the flux from the main pole 130 to be absorbed by the side shields 140. Thus, the magnetic write flux and reverse overwrite (ReOW) may be improved. The small, constant side gap width in the conformal region 152 may reduce the adjacent track interference (ATI). Performance may be improved. In embodiments in which the sidewall angle of the main pole 130 decreases away from the ABS, the magnetic field generated by the main pole 130 and used to write to the media 102 may be enhanced. The ReOW gain may be further improved. The gradient in the magnetic field may also be improved while maintaining substantially the same side fields. As a result, ATI may not be adversely affected. Further, the pole tip region 132 of the main pole 130 may have an increased magnetic volume. Stated differently, the pole tip region 132 may include more magnetic material. As a result, the cross track magnetic anisotropy may be improved and domain lockup issues mitigated. Thus, performance of the disk drive 100 may be improved.

Figure 4:
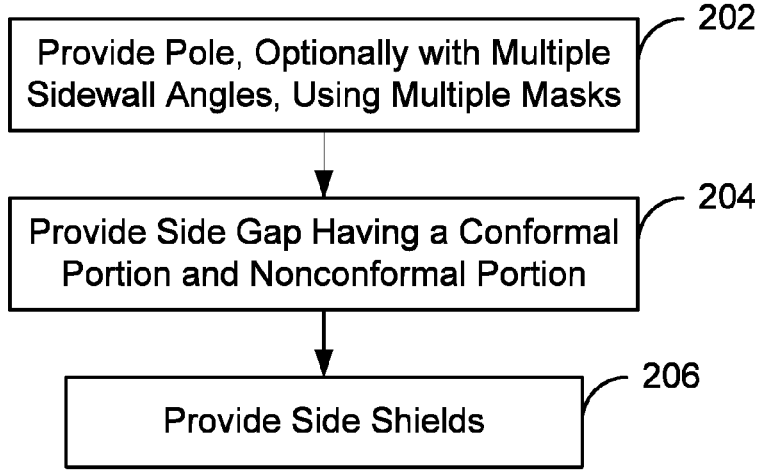
FIG. 4 depicts a flow chart of an exemplary embodiment of a method for providing a magnetic recording transducer.

FIG. 4 depicts an exemplary embodiment of a method 200 for providing a magnetic recording transducer having a gradient in the side gap width. For simplicity, some steps may be omitted, interleaved, and/or combined. The method 200 is described in the context of providing a magnetic recording disk drive 100 and transducer 120 depicted in FIGS. 2, 3A, 3B and 3C. However, the method 200 may be used to fabricate multiple magnetic recording heads at substantially the same time. The method 200 may also be used to fabricate other magnetic recording transducers. The method 200 is also described in the context of particular layers. A particular layer may include multiple materials and/or multiple sub-layers. The method 200 also may start after formation of other portions of the magnetic recording head. For example, the method 200 may start after a read transducer, return pole/shield and/or other structure have been fabricated.

Referring to FIGS. 2, 3A-3C and 4, the main pole 130 is provided using multiple masks, via step 202. These masks have apertures which overlap in a region in which the main pole 130 is formed. For example, step 202 may include using one or more damascene processes. In such embodiments, a trench may be formed in a layer using a first mask having a first aperture therein. The first aperture exposes the layer and corresponds to the location of the trench. In embodiments in which the sidewalls 136 and 138 are desired to have sidewall angles that change a particular distance from the ABS, the trench may be fabricated such that portions of the trench sidewalls form different angles with the down track direction. A second mask may then be provided. The second mask has another aperture therein. The aperture in the second mask overlaps a portion of the trench. The material(s) for the pole 130 are deposited, for example via plating. One or more ferromagnetic materials may be used. Because of the use of multiple masks, the ferromagnetic materials may occupy only a portion of the trench. Excess pole material(s) external to the trench may also be removed. The pole tip 132 and yoke 134 may be formed. Other methods may also be used to form the pole 130 including but not limited to full film deposition of magnetic materials and removal for example via milling and/or lapping. In such embodiments, multiple masks may also be used.

The side gap 150 is provided, via step 204. Step 204 includes depositing one or more materials such that the side gap 150 has both a conformal region 152 and a nonconformal region 154. The conformal region is thus between the ABS and the nonconformal region. In some embodiments, a portion of the side gap may be formed before the ferromagnetic materials for the pole are deposited. For example, one or more nonmagnetic seed layers may be deposited before the ferromagnetic materials. In some embodiments, these layers form the conformal region 152. Additional side gap material(s) may be deposited after formation of the pole 130. For example, a nonmagnetic material such as aluminum oxide may be provided. This material may fill in a region between the pole and the nonmagnetic seed layer(s).

The side shield 140 are provided, via step 206. Step 206 may be performed by depositing the side shield materials on the side gap 150.

Using the method 200, the magnetic disk drive 100 and magnetic transducer 120 may be provided. Thus, the benefits of the magnetic transducers 120 may be achieved. For example, enhanced magnetic write flux and improved ReOW and reduced ATI may be attained. Thus, performance of the disk drive 100 may be improved.

Figure 5:
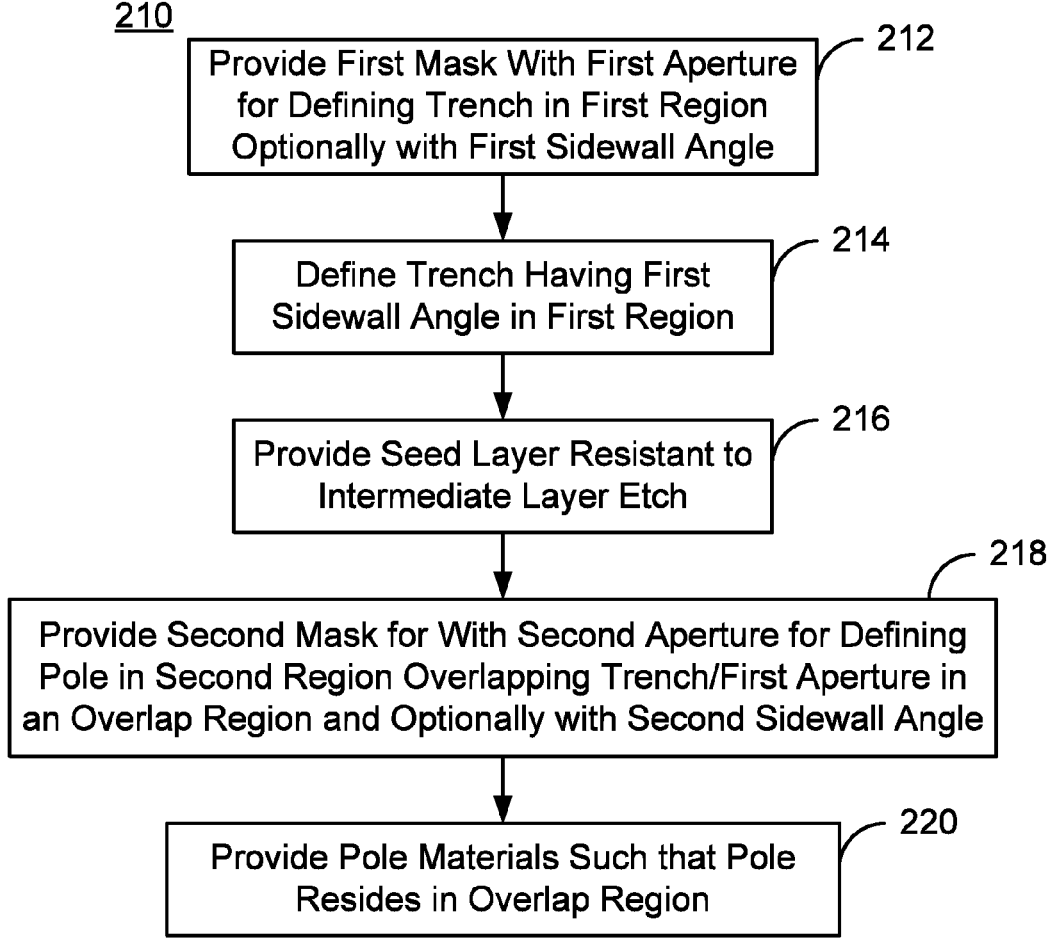
FIG. 5 depicts a flow chart of another exemplary embodiment of a method for providing a main pole of a magnetic recording transducer.

FIG. 5 depicts an exemplary embodiment of a method 210 for providing a pole for a magnetic recording transducer having a gradient in the side gap width. For simplicity, some steps may be omitted, interleaved, and/or combined. The method 210 is described in the context of providing the pole 130 of the magnetic recording disk drive 100 and transducer 120 depicted in FIGS. 2, 3A, 3B and 3C. However, the method 210 may be used to fabricate multiple poles at substantially the same time. The method 210 may also be used to fabricate other poles for other magnetic recording transducers. The method 210 is also described in the context of particular layers. A particular layer may include multiple materials and/or multiple sub-layers. The method 210 also may start after formation of other portions of the magnetic recording head. For example, the method 200 may start after a read transducer, return pole/shield and/or other structure have been fabricated.

Referring to FIGS. 2, 3A-3C and 5, a first mask with a first aperture is provided on an intermediate layer, via step 212. The first mask may be a hard mask. The aperture corresponds to the location and shape of a trench desired to be formed in the intermediate layer. In some embodiments, the intermediate layer is aluminum oxide.

A portion of the intermediate layer is removed to define the trench, via step 214. In some embodiments, the trench is formed using a reactive ion etch (RIE). For example, an aluminum oxide RIE may be used for an aluminum oxide intermediate layer. Further, the conditions under which the RIE is performed may be selected such that the trench has a nonzero sidewall angle with the down track direction. For example, the trench may have an angle $\alpha 0$ with the down track direction.

A seed layer that is resistant to an etch of the intermediate layer is deposited in the trench, via step 216. In some embodiments, a Ru layer is deposited in step 216. In other embodiments, a Ta or other layer may be deposited. In some embodiments, a multilayer seed layer may be provided in step 216.

A second mask having a second aperture is provided, via step 218. The second aperture overlaps a portion of the trench. Stated differently, a portion of the second aperture is in the same location as a portion of the first aperture. However, the apertures are not identical. Consequently, the second aperture may cover a portion of the trench. Similarly, the second aperture may leave uncovered a portion of the underlying layer(s) that the first aperture covered. In some embodiments, the sidewall angle of the second mask is different from the sidewall angle of the trench formed using the first mask. In some embodiments, the second mask is a photoresist mask and may have vertical sidewalls. In other embodiments, other angles are possible for the second mask. In some embodiments, the sidewall angles may be the same as for the trench. In some embodiments, the second mask substantially covers the top layer of the transducer 120 except for the second aperture. However, in other embodiments, a frame mask may be used.

The material(s) for the main pole 130 are provided, via step 220. Step 220 may include plating high saturation magnetization materials. Because of the formation of the trench and the presence of the second mask, the pole materials fill the overlap region of the trench/first aperture and the second aperture. Excess pole materials may also be removed in step 220. For example, a planarization such as a chemical mechanical planarization (CMP) and/or a wet etch may be used to remove pole materials outside of the trench. Consequently, the main pole 130 that may be used in conjunction with the gradient side gap 150 may be provided.

Using the method 200, the magnetic disk drive 100 and magnetic transducer 120 may be provided. Thus, the benefits of the magnetic transducers 120 may be achieved. For example, enhanced magnetic write flux and improved ReOW and reduced ATI may be attained. Thus, performance of the disk drive 100 may be improved.

Figure 6:
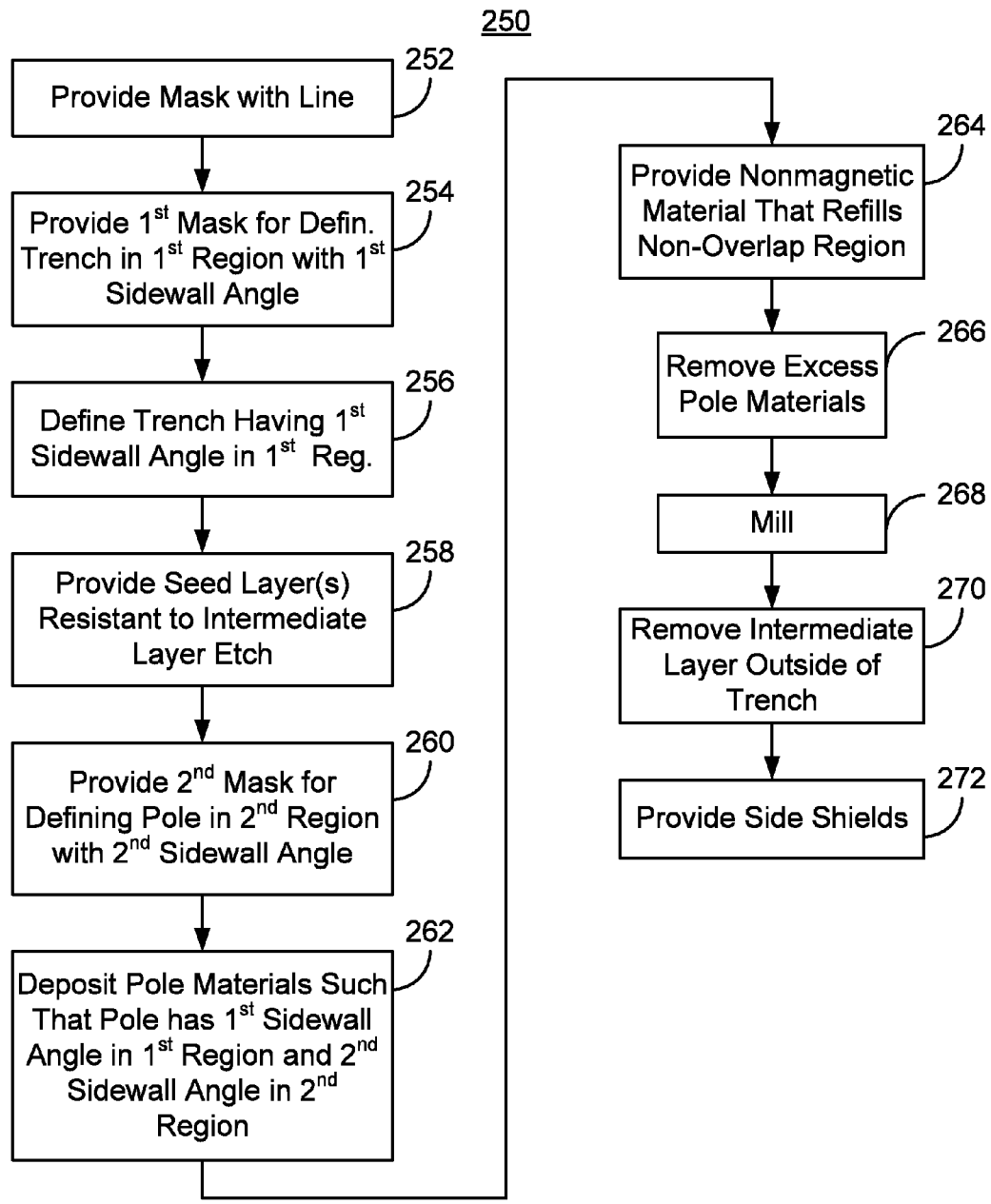
FIG. 6 depicts a flow chart of another exemplary embodiment of a method for providing a magnetic recording transducer.
Figure 7A:
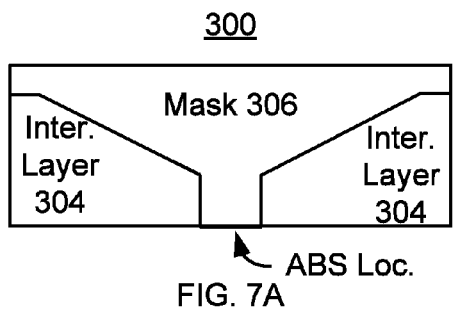
Figure 7B:
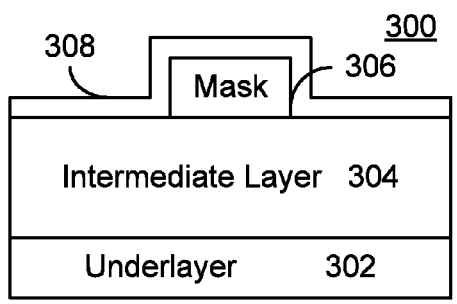
Figure 15A:
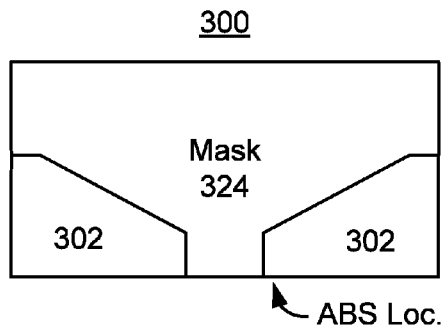
Figure 16A:
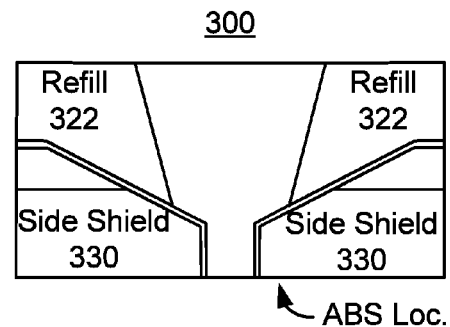
Figure 15B:
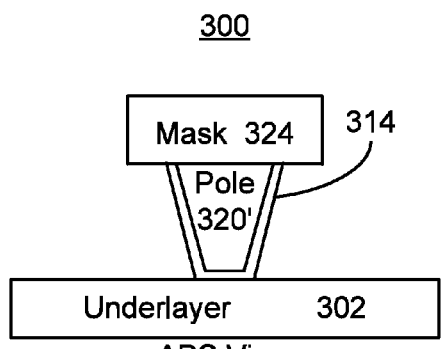
Figure 16B:
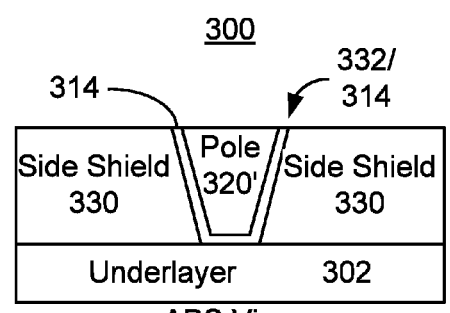
Figure 15C:
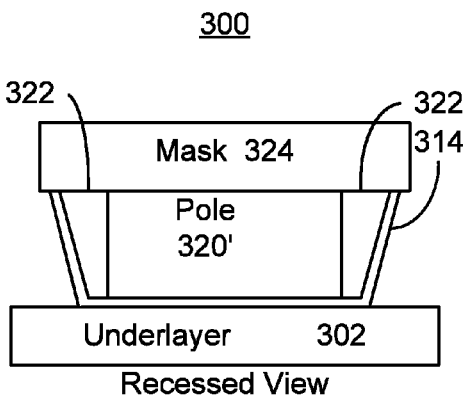
Figure 16C:
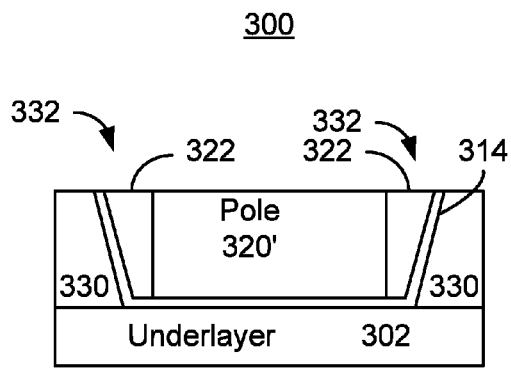

FIG. 6 depicts an exemplary embodiment of a method 250 for providing a magnetic recording transducer 120 having a gradient side gap and, in some embodiments, a main pole that may has a varying sidewall angle. For simplicity, some steps may be omitted, interleaved, and/or combined. The method 200 is also described in the context of providing a magnetic recording head 100 and transducer 120 depicted in FIGS. 2, 3A, 3B and 3C. FIGS. 7A-B though FIGS. 16A-C depict an exemplary embodiment of a transducer 300 during fabrication using the method 250. FIGS. 7A-B-FIGS. 16A-C correspond to one embodiment of the method 250. FIGS. 17A-B through FIGS. 29A-C depict a transducer 400 that corresponds to another embodiment of the method 250. Referring to FIGS. 6-16C, the method 250 may be used to fabricate multiple magnetic recording heads at substantially the same time. The method 250 may also be used to fabricate other magnetic recording transducers. The method 250 is also described in the context of particular layers. A particular layer may include multiple materials and/or multiple sub-layers. The method 250 also may start after formation of other portions of the magnetic recording transducer. For example, the method 250 may start after a read transducer, return pole/shield and/or other structure have been fabricated.

Figure 8A:
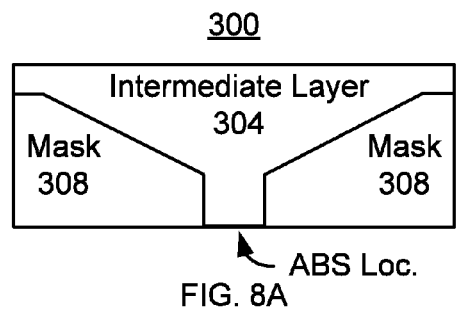
Figure 8B:
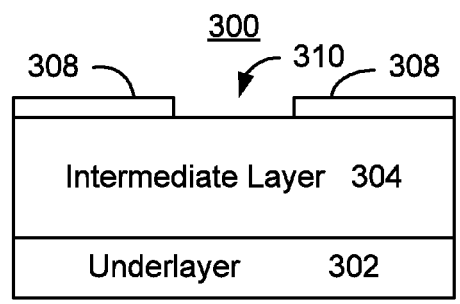

A line mask is provided on an intermediate layer, via step 252. The line may be a photoresist line. A first mask with a first aperture is provided on the intermediate layer using the line mask, via step 254. Step 254 includes depositing a hard mask layer on the intermediate layer and line mask and then removing the line mask. FIGS. 7A and 7B depict plan and ABS views of the transducer 300 during step 254. Thus, an underlayer 302 and intermediate layer 304 are shown. The intermediate layer 304 may be aluminum oxide. Also depicted are the line mask 306 as well as the hard mask layer 308 for the first mask being formed. FIGS. 8A-8B depict plan and ABS views of the transducer 300 after step 254 is performed. Thus, the mask 308 having aperture 310 has been formed through removal of the mask 306. The aperture 310 corresponds to the location and shape of a trench desired to be formed in the intermediate layer.

Figure 9A:
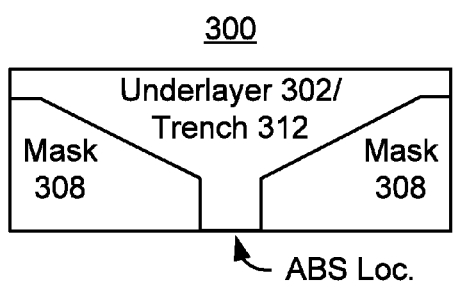
Figure 9B:
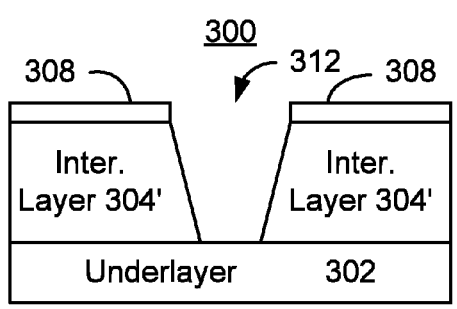

The trench is then formed in the intermediate layer 304, via step 256. Step 256 may be using an aluminum oxide RIE. For example, an aluminum oxide RIE may be sued for an aluminum oxide intermediate layer. FIGS. 9A-9B depict plan and ABS views of the transducer 300 after step 256 is performed. Thus, trench 312 has been formed in the intermediate layer 304'. Further, the conditions under which the aluminum oxide RIE is may be selected such that the trench 312 has a nonzero sidewall angle with the down track direction.

Figure 10A:
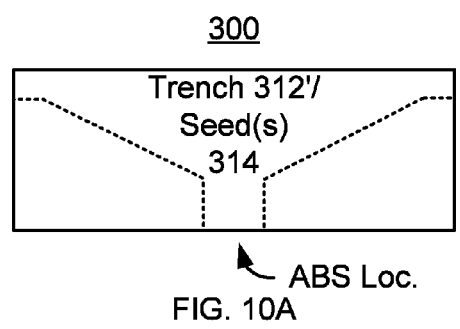
Figure 10B:
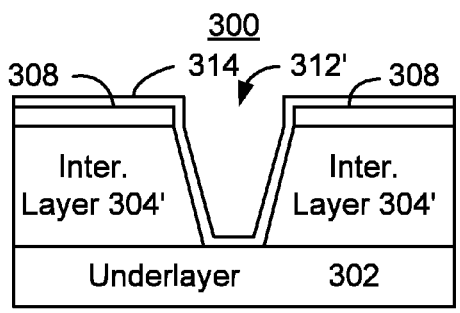
Figure 11A:
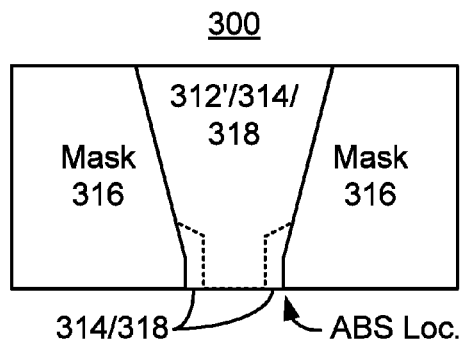

A seed layer that is resistant to an etch of the aluminum oxide intermediate layer is deposited in the trench, via step 258. FIGS. 10A-10B depict the transducer 300 after step 258 is performed. Thus, a seed layer 314 has been deposited. The dashed in FIG. 10A indicates the presence of the trench 312 under the seed layer 314. A remaining portion of the trench 312' remains open. In some embodiments, a Ru layer is deposited in step 258. In other embodiments, a Ta or other layer may be deposited. In some embodiments, a multilayer seed layer may be provided in step 258.

A second mask having a second aperture is provided, via step 260. In some embodiments, step 260 includes providing a photoresist layer and developing the second aperture using photolithographic techniques. The second aperture overlaps a portion of the trench. Stated differently, a portion of the second aperture is in the same location as a portion of the first aperture. However, the apertures are not identical. FIGS.

Figure 11C:
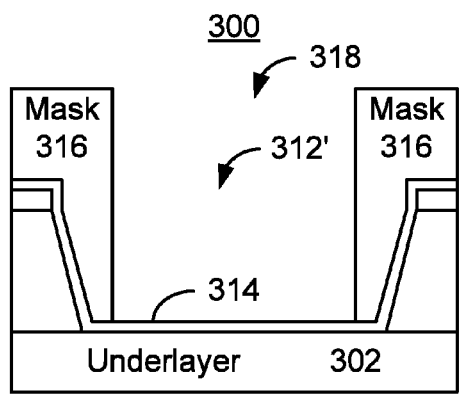

11A-11C depict plan, ABS and recessed views of the transducer 300. Thus, a mask 316 having aperture 318 therein is shown. The aperture 318 and trench 312' overlap near the ABS. This can be seen in FIG. 11B, which depicts the trench 312' as wider than the aperture 318 at the ABS. In contrast, at a location recessed from the ABS, the overlap region is smaller than the trench 312'. This may be seen, for example, in FIG. 11C, which depicts the trench 312' as wider than the aperture 318. In the embodiment shown, the sidewall angle of the second mask 316 is different from the sidewall angle of the trench 312'. It is noted that the region in which the overlap is smaller than the trench 312' adjoins the nonconformal portion of the side gap. Part of this region is depicted in FIG. 11C. The region in which the aperture 318 is larger than the trench 312' and, therefore, the overlap includes the sidewalls of the trench 312', corresponds to the conformal region of the side gap. The second mask 316 has vertical sidewalls for the aperture 318.

Figure 12A:
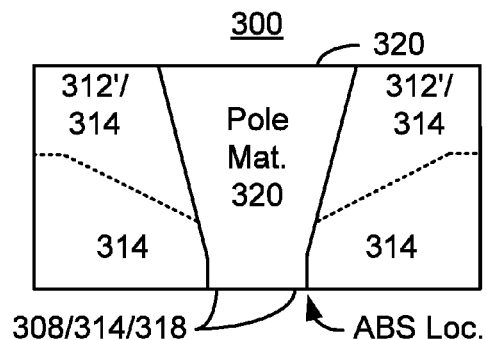
Figure 11B:
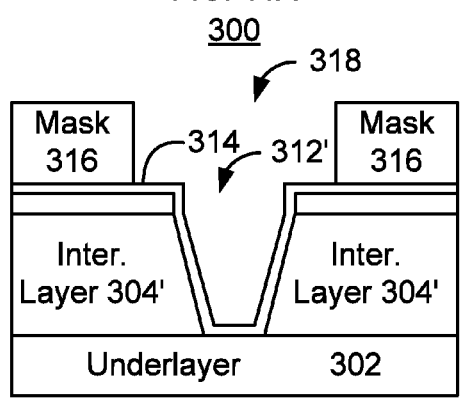
Figure 12B:
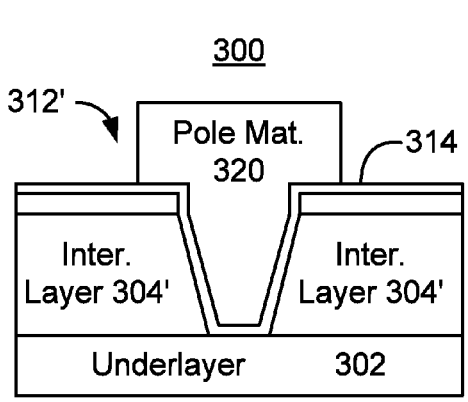
Figure 12C:
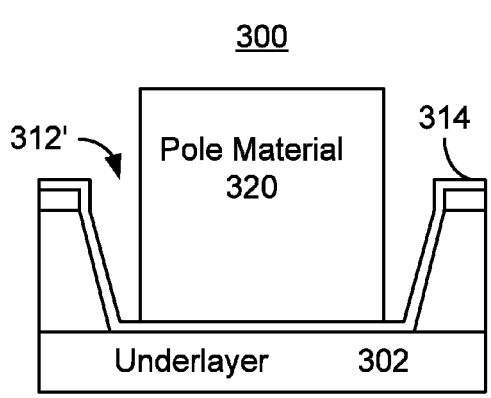

Materials for the pole are deposited, via step 262. Step 262 may include plating high saturation magnetization materials. Because of the formation of the trench 312' and the aperture 318 of the second mask 316, the pole materials fill the overlap region of the trench/first aperture and the second aperture. In addition, the second mask 316 may be removed. FIGS. 12A-12C depict plan, ABS and recessed views of the transducer 300 after step 262 is performed. Consequently, the main pole materials 320 are shown. As can be seen in FIGS. 12A-12C, particularly FIGS. 12B and 12C, the pole materials 320 fill the trench 312' in the conformal region near the ABS but do not fill the trench 312' in the nonconformal region recessed from the ABS.

Figure 13A:
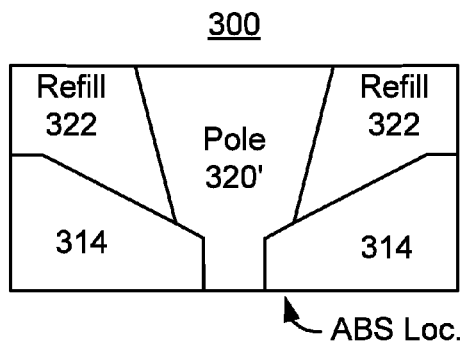
Figure 13B:
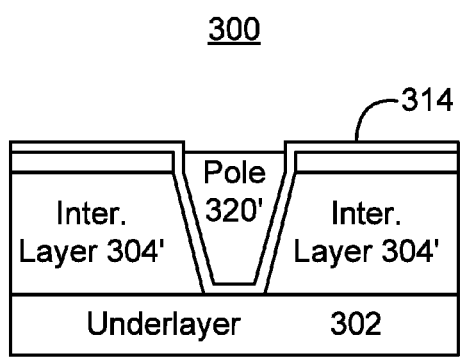
Figure 13C:
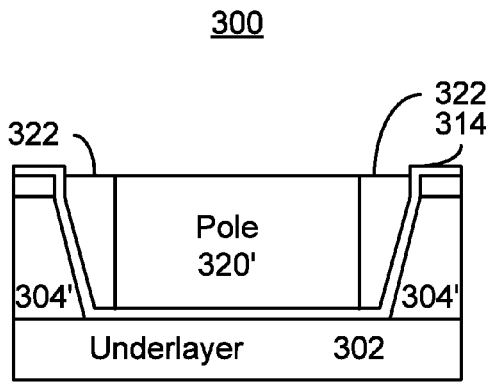

A refill step is performed, via step 264. A nonmagnetic material is provided to refill a portion of the trench 312' in which there are no pole materials 320. Excess pole materials may also be removed in step 266. For example, a CMP and/or a wet etch may be used to remove pole materials outside of the trench. FIGS. 13A-13C depict plan, ABS and recessed views of the transducer 300 after step 266 is performed. In the embodiment shown in FIGS. 13A-13C, no wet etch is performed. Thus, the magnetic materials outside of the trench are removed through the CMP and the pole 320' is formed. In addition, the refill 322 is shown. In some embodiments, the refill 322 is aluminum oxide. In other embodiments, other materials may be used. Thus, the seed layer 314 may be used to form the side gap in the conformal region at the ABS, while the seed layer 314 and the refill 322 may form the nonconformal portion of the side gap recessed from the ABS.

Figure 14A:
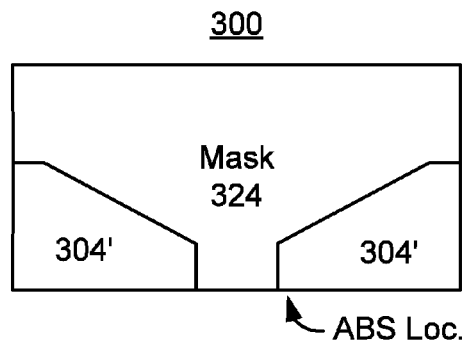
Figure 14B:
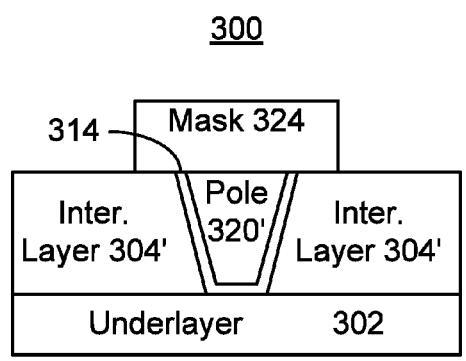
Figure 14C:
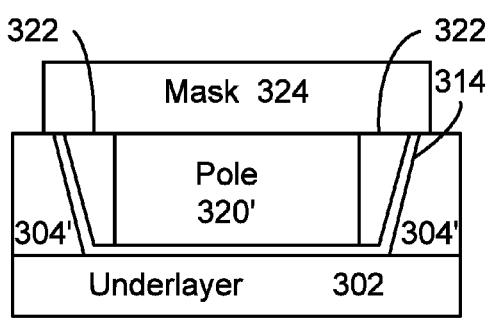

An ion mill may be performed to remove the excess seed layer 314 and mask layer outside of the trench 312', via step 268. A portion of the intermediate layer outside of the trench 312' is removed, via step 270. Step 270 may be performed using a wet etch for the intermediate layer. For example, an aluminum oxide may be performed. FIGS. 14A-14C depict plan, ABS and recessed views of the transducer 300 during step 270. A mask 324 has been provided to protect the pole 320' during the removal of the intermediate layer. FIGS. 15A-15C depict plan, ABS and recessed views of the transducer 300 after step 270 is performed. Thus, the intermediate layer has been removed. The seed layer 314, which may be Ru in the embodiment shown, also acts as a stop layer for the wet etch. Thus, the pole 320 and refill 322 remain after the wet etch is performed.

The side shields are provided, via step 272. Step 272 may include depositing a high permeability material, such as NiFe, while the mask 324 is in place. This may include plating such a material. The mask 324 may then be removed. FIGS. 16A-16C depict plan, ABS and side views of the transducer 300 after step 272 is performed. Note that for clarity, the seed layer 314 is not labeled in FIG. 16A. Thus, side shields 330 are shown. As can be seen in FIG. 16A, the side shields do not extend to sides of the trench in the embodiment shown. However, in other embodiments, the side shields 330 may extend a different distance in the stripe height direction. Further, the side gap 332 is shown. Near the ABS, the side gap 332 is made up of the seed layer 314. However, further from the ABS, the side gap 332 includes both the seed layer 314 and the refill 322. In some embodiments, the conformal region of the side gap 332 extends not more than four hundred nanometers from the ABS. In some embodiments, the conformal region the side gap 332 extends not more than two hundred nanometers and at least ten nanometers from the ABS. In other embodiments, the conformal region the side gap 332 extends at least eighty and not more than one hundred and twenty nanometers from the ABS.

Using the method 250, the magnetic transducer 300 may be provided. Thus, benefits analogous to those of the magnetic transducers 120 may be achieved. For example, enhanced magnetic write flux and improved ReOW and reduced ATI may be attained for the transducer 300. Thus, performance of the transducer 300 may be improved.

FIGS. 17A-B through FIGS. 29A-C depict a transducer 400 that corresponds to another embodiment of the method 250. Referring to FIGS. 6 and 17A-B through 29A-C, the method 250 may be used to fabricate multiple magnetic recording heads at substantially the same time.

Figure 17A:
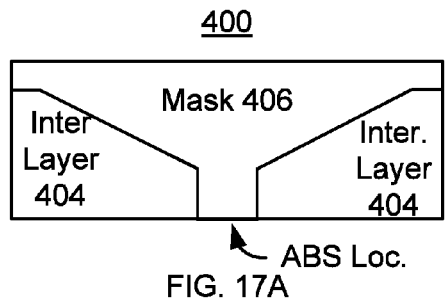
Figure 18A:
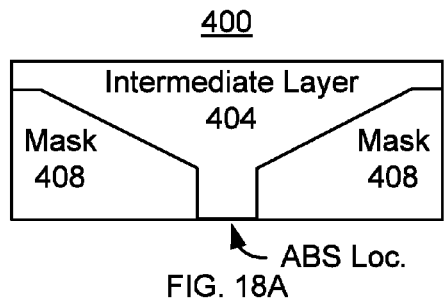
Figure 17B:
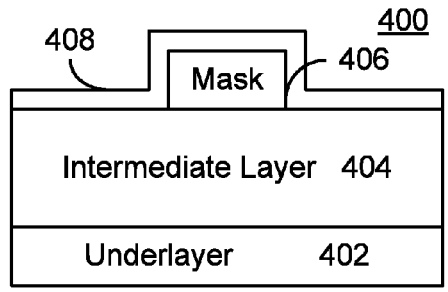
Figure 18B:
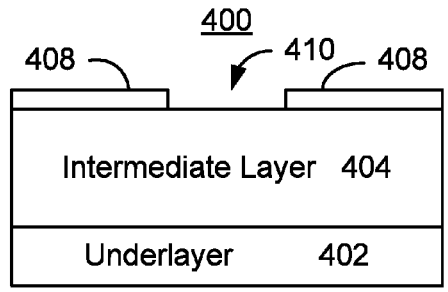

A line mask is provided on an intermediate layer and a first mask having an aperture therein in steps 252 and 254, respectively. FIGS. 17A and 17B depict plan and ABS views of the transducer 400 during step 254. Thus, an underlayer 402 and intermediate layer 404 are shown. The intermediate layer 304 may be aluminum oxide. Also depicted are the line mask 406 as well as the hard mask layer 408 for the first mask being formed. FIGS. 18A-18B depict plan and ABS views of the transducer 400 after step 254 is performed. Thus, the mask 408 having aperture 410 has been formed through removal of the mask 406. The aperture 410 corresponds to the location and shape of a trench desired to be formed in the intermediate layer.

Figure 19A:
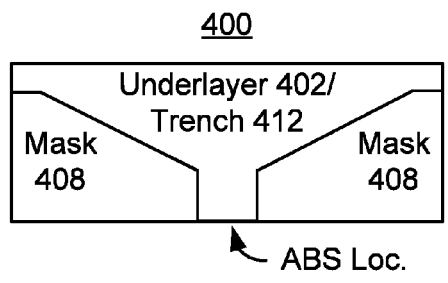
Figure 19B:
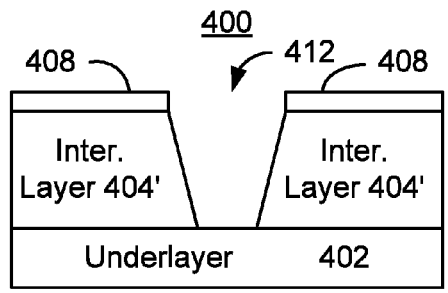

The trench is then formed in the intermediate layer 404 in step 256 as discussed above. FIGS. 19A-19B depict plan and ABS views of the transducer 400 after step 256 is performed. Thus, trench 412 has been formed in the intermediate layer 404'. Further, the conditions under which the aluminum oxide RIE is may be selected such that the trench 412 has a nonzero sidewall angle with the down track direction.

Figure 20A:
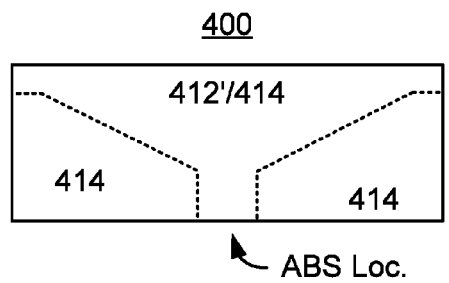
Figure 20B:
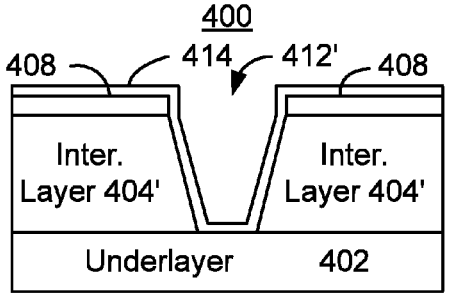

A seed layer is deposited in the trench in step 258. FIGS. 20A-20B depict the transducer 400 after a first layer seed layer is deposited in step 258. Thus, a Ta seed layer 414 has been deposited. A remaining portion of the trench 412' remains open.

Figure 21A:
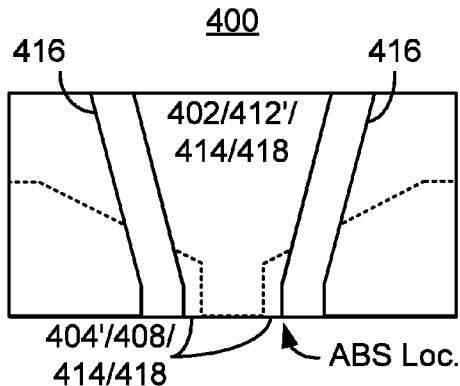
Figure 21B:
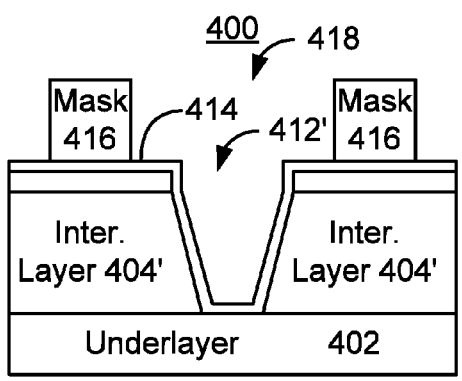
Figure 21C:
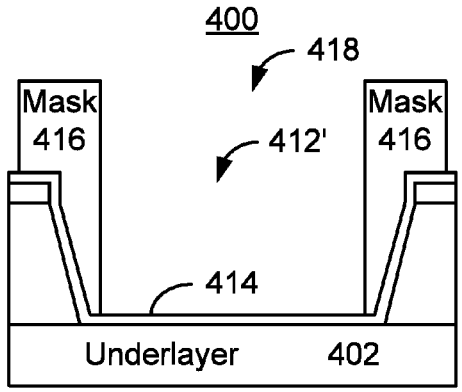

A second mask having a second aperture is provided in step 260 in a manner discussed above. However, in this embodiment, a frame mask is used. FIGS. 21A-21C depict plan, ABS and recessed views of the transducer 400. Thus, a frame mask 416 having aperture 418 therein is shown. The aperture 418 and trench 412' overlap near the ABS. This can be seen in FIG. 21B, which depicts the trench 412' as wider than the aperture 418 at the ABS. In contrast, at a location recessed from the ABS, the overlap region is smaller than the trench 412'. This may be seen, for example, in FIG. 21C, which depicts the trench 412' as wider than the aperture 418. In the embodiment shown, the sidewall angle of the second, frame mask 416 is different from the sidewall angle of the trench 412'. The region in which the overlap is smaller than the trench 412' adjoins the nonconformal portion of the side gap. Part of this region is depicted in FIG. 21C. The region in which the aperture 418 is larger than the trench 412' and, therefore, the overlap includes the sidewalls of the trench 412', corresponds to the conformal region of the side gap. The second mask 416 has vertical sidewalls for the aperture 418.

Figure 22A:
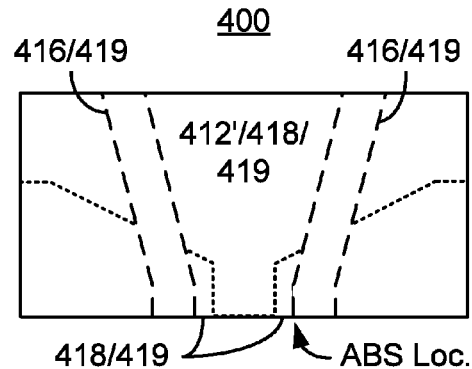
Figure 22B:
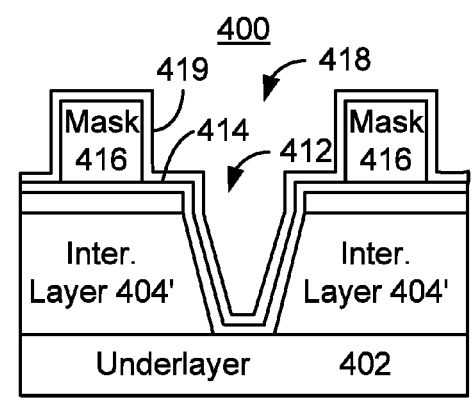
Figure 22C:
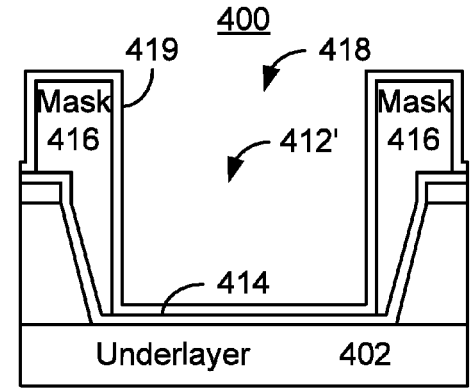

In addition, step 258 is completed by depositing a second seed layer. FIGS. 22A-22C depict plan, ABS and recessed views of the transducer 400. The seed layer 419 has been deposited. Thus, the Ta layer 414 of the seed layer is below the frame mask 416 while the Ru layer 419 may reside on the frame mask 416.

Figure 23A:
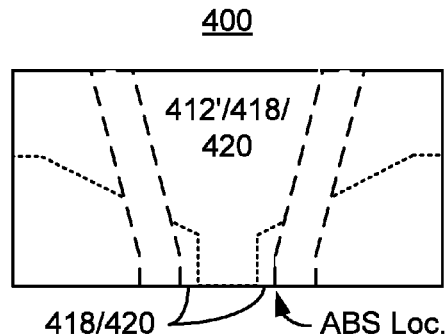
Figure 24A:
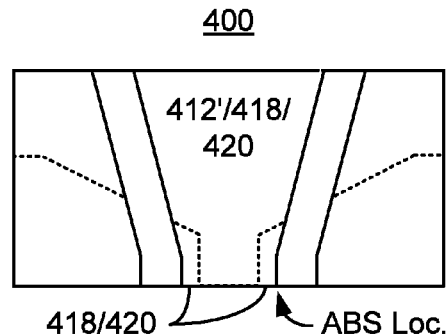
Figure 23B:
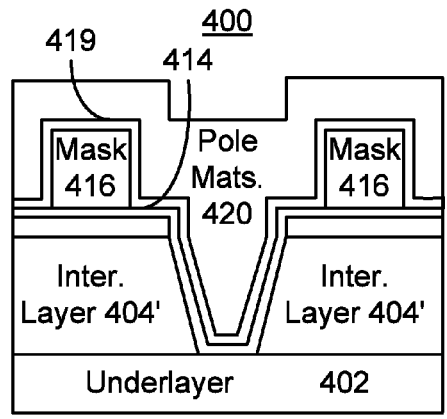
Figure 24B:
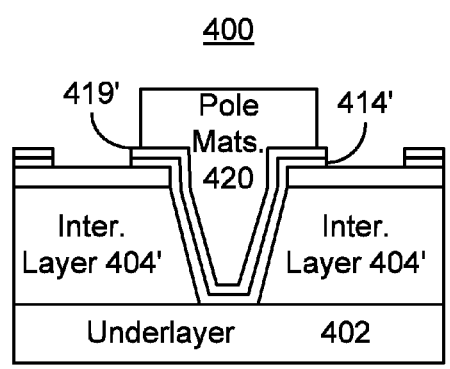
Figure 23C:
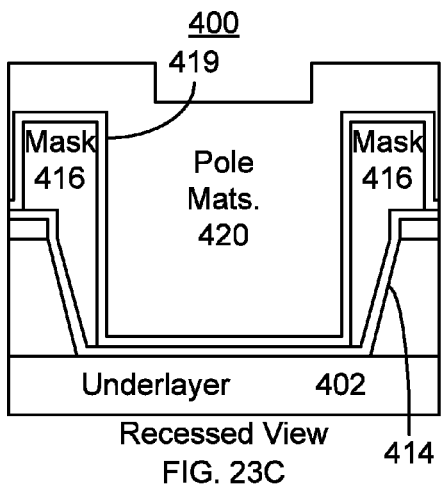
Figure 24C:
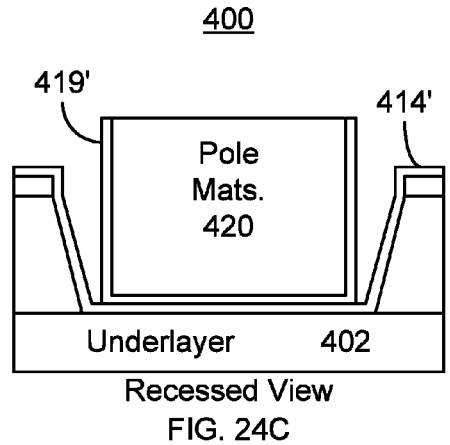

Materials for the pole are deposited in step 262 as discussed above. FIGS. 23A-23C depict plan, ABS and recessed views of the transducer 400 after step 262 is performed. Consequently, the main pole materials 420 are shown. As can be seen in FIGS. 23A-23C, particularly FIGS. 23B and 23C, the pole materials 420 fill the trench 312' in the conformal region near the ABS but do not fill the trench 312' in the nonconformal region recessed from the ABS. The frame mask 416 may then be removed, for example through a CMP and/or lift off. FIGS. 24A-24C depict plan, ABS and recessed views of the transducer 400 after the mask 416 has been removed. Further, a wet etch of pole materials outside of the aperture 418 has been performed. Thus, a portion of step 266 has been performed. Thus, only the pole material in the aperture 418 remains.

Figure 25A:
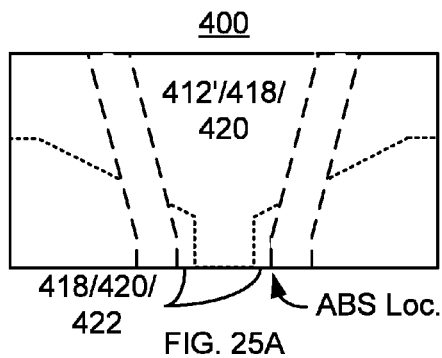
Figure 25B:
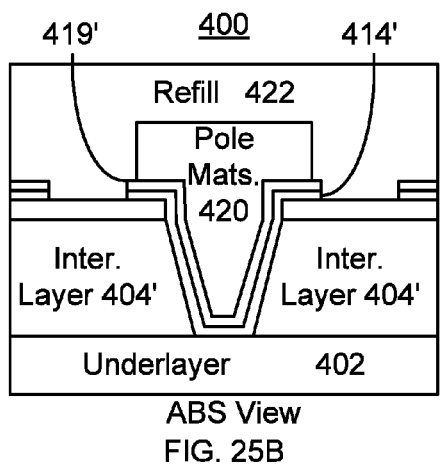
Figure 25C:
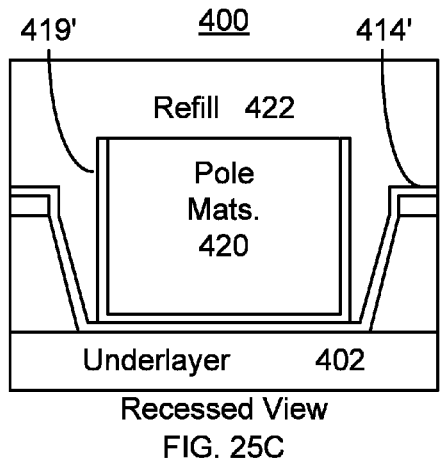

A refill step is performed in step 264 as discussed above. FIGS. 25A-25C depict plan, ABS and recessed views of the transducer 400. A refill material 422, such as aluminum oxide has been provided.

Figure 26A:
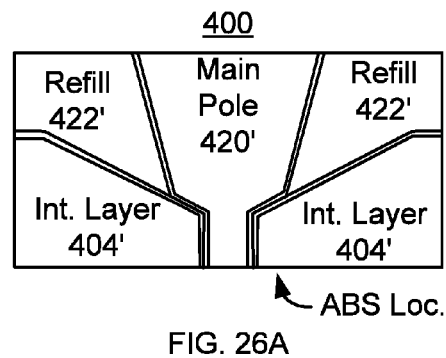
Figure 26B:
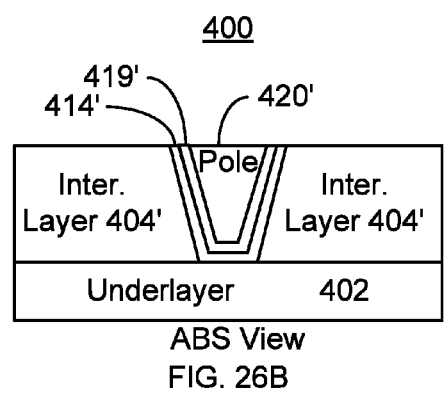
Figure 26C:
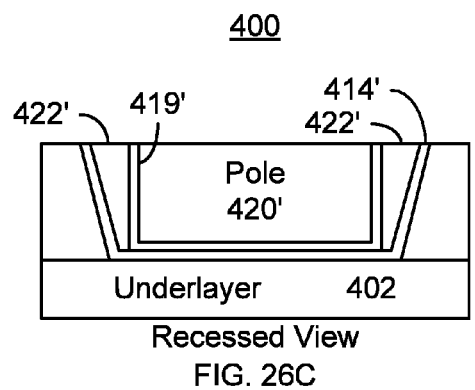

Remaining excess pole materials may be removed in step 266. A CMP may be used to remove pole materials outside of the trench, completing step 266. FIGS. 26A-26C depict plan, ABS and recessed views of the transducer 400 after step 266 is completed. Thus, the remaining magnetic materials outside of the trench are removed through the CMP and the pole 420' is formed.

An ion mill may be performed to remove the excess seed layers 414 and 419 and mask layer outside of the trench 412' in step 268 in a manner described above. FIGS. 26A-26C depict plan, ABS and recessed views of the transducer 400 after step 268 is performed. Thus, the seed layers 414' and 419' may be used to form the side gap in the conformal region at the ABS, while the seed layers 414' and 419' in combination with the refill 422' may form the nonconformal portion of the side gap recessed from the ABS.

Figure 27A:
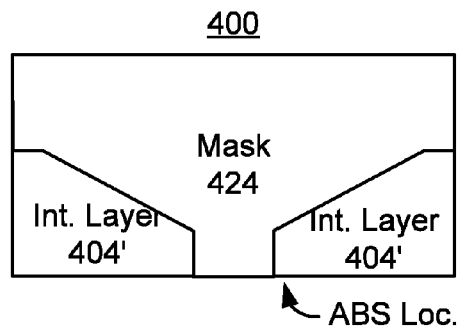
Figure 28A:
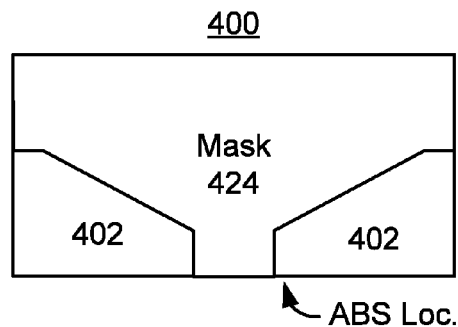
Figure 27B:
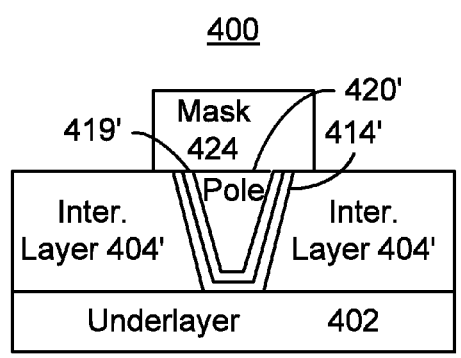
Figure 28B:
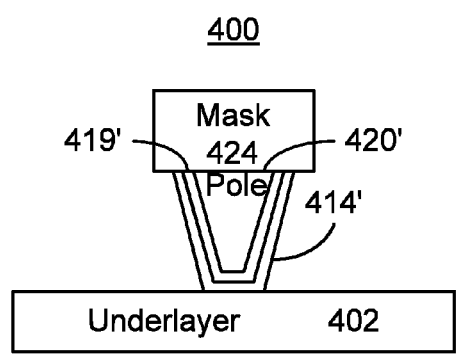
Figure 27C:
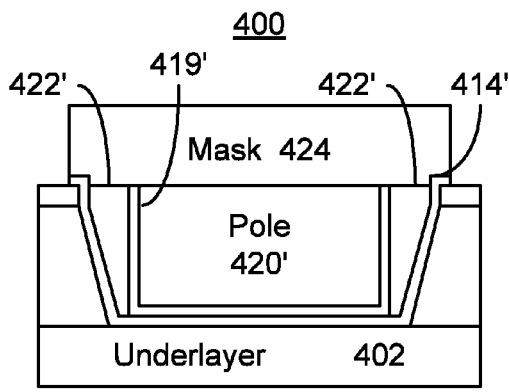
Figure 28C:
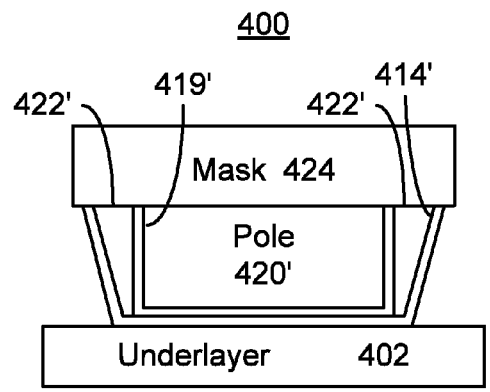

A portion of the intermediate layer outside of the trench 412' is removed in step 270 as described above. FIGS. 27A-27C depict plan, ABS and recessed views of the transducer 400 during step 270. A mask 424 has been provided to protect the pole 320' during the removal of the intermediate layer. FIGS. 28A-28C depict plan, ABS and recessed views of the transducer 400 after step 270 is performed. Thus, the intermediate layer has been removed. The seed layer 414 also acts as a stop layer for the wet etch. Thus, the seed layers 414' and 419', the pole 420' and refill 422' remain after the wet etch is performed.

Figure 29A:
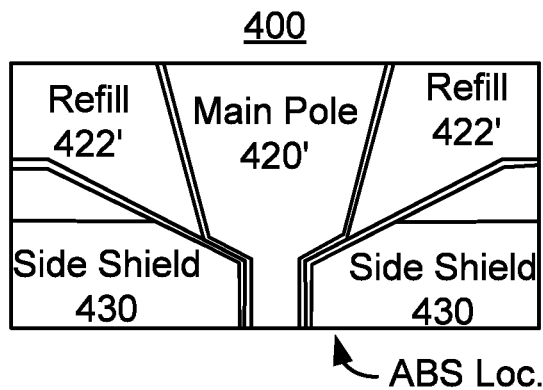
Figure 29B:
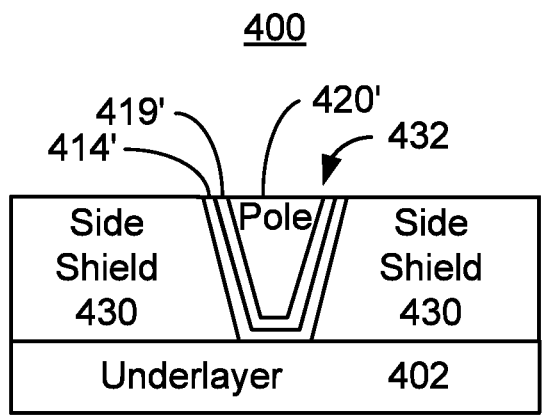
Figure 29C:
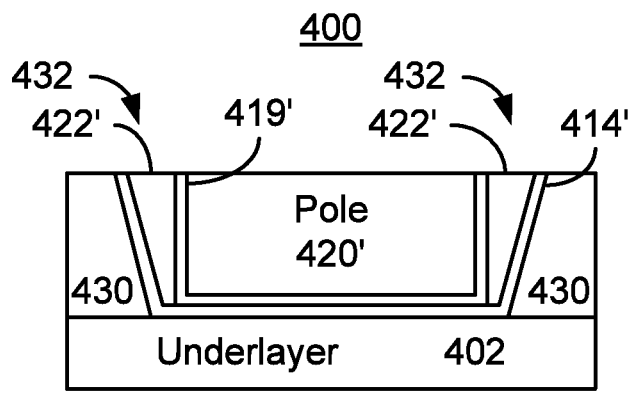

The side shields are provided in a manner described above via step 272. FIGS. 29A-29C depict plan, ABS and side views of the transducer 400 after step 272 is performed. Note that for clarity, the seed layers 414 and 419 are not labeled in FIG. 29A. Thus, side shields 430 are shown. As can be seen in FIG. 29A, the side shields do not extend to sides of the trench in the embodiment shown. However, in other embodiments, the side shields 430 may extend a different distance in the stripe height direction. Further, the side gap 432 is shown. Near the ABS, the side gap 432 is made up of the seed layers 414 and 419. However, further from the ABS, the side gap 432 includes the seed layers 414 and 419 as well as the refill 422. In some embodiments, the conformal region of the side gap 432 extends not more than four hundred nanometers from the ABS. In some embodiments, the conformal region the side gap 432 extends not more than two hundred nanometers and at least ten nanometers from the ABS. In other embodiments, the conformal region the side gap 432 extends at least eighty and not more than one hundred and twenty nanometers from the ABS.

Using the method 250, the magnetic transducer 400 may be provided. Thus, benefits analogous to those of the magnetic transducers 120 may be achieved. For example, enhanced magnetic write flux and improved ReOW and reduced ATI may be attained for the transducer 400. Thus, performance of the transducer 400 may be improved.

We claim:

1. A method for fabricating magnetic transducer having air-bearing surface (ABS) location comprising:
   providing a main pole using a plurality of masks including a plurality of apertures therein, the plurality of apertures overlap in an overlap region, at least a portion of the main pole residing in the overlap region, the step of providing the main pole further including:
   providing a first mask of the plurality of masks on an intermediate layer, the first mask having a first aperture therein, the first aperture exposing a portion of the intermediate layer;
   removing the portion of the intermediate layer exposed by the first aperture to provide a trench;
   providing at least one seed layer, at least a portion of the at least one seed layer residing in the trench;
   providing a second mask of the plurality of masks on the intermediate layer, the second mask having a second aperture therein, the second aperture overlapping the trench in the overlap region;
   providing at least one pole material such that at least a portion of the main pole resides in the overlap region, the main pole having a plurality of sidewalls, first portion of the plurality of sidewalls being conformal to a first portion of the trench, a second portion of the plurality of sidewalls being conformal to a portion of the second mask and being nonconformal with a second portion of the trench;
   providing a side gap adjacent to a portion of the main pole, the side gap having a conformal portion and a nonconformal portion, the conformal portion being adjacent to the ABS location and the overlap region, the conformal portion between the ABS location and the nonconformal portion; and
   providing a side shield, the side gap residing between the side shield and the main pole.

2. The method of claim 1 wherein the main pole includes a bottom, a top and the plurality of sidewalls between the top and the bottom, at least one of the plurality of sidewalls forming a first angle with a down track direction at the ABS and a second sidewall angle with the down track direction at a first distance recessed from the ABS, the first sidewall angle being greater than the second sidewall angle.

3. The method of claim 2 wherein the second sidewall angle is zero degrees.

4. The method of claim 1 wherein the step of providing the main pole further includes:
   depositing the at least one pole material; and
   removing a portion of the pole material external to the overlap region using a planarization step.

5. The method of claim 1 wherein the trench has at least one trench sidewall and wherein the step of providing the side gap includes:

providing at least one refill material after, a portion of the at least one refill material residing in a non-overlap region of the trench between the overlap region and the at least one trench sidewall.

6. The method of claim 1 wherein the step of providing the side shield includes:

removing a portion of the intermediate layer after the step of providing the refill material using a removal process, the at least one seed layer being resistant to the removal process; and depositing at least one side shield material.

7. The method of claim 1 wherein the conformal region extends to not more than four hundred nanometers from the ABS.

8. The method of claim 7 wherein the conformal region extends to not more than two hundred nanometers from the ABS.

9. The method of claim 7 wherein the conformal region extends to at least ten nanometers from the ABS.

10. The method of claim 9 wherein the conformal region extends to at least eighty nanometers form the ABS and to not more than one hundred twenty nanometers from the ABS.

11. The method of claim 1 wherein the second mask is a frame mask.

12. The method of claim 11 wherein the step of providing the at least one seed layer further includes:

providing a Ta layer before the step of providing the second mask; and depositing a Ru layer after the step of providing the second mask.

13. A method for fabricating magnetic transducer having air-bearing surface (ABS) location comprising:

providing a first mask on an intermediate layer residing on an underlayer, the first mask having a first aperture therein, the first aperture exposing a portion of the intermediate layer;

reactive ion etching the portion of the intermediate layer exposed by the first aperture to provide a trench in the intermediate layer, the trench having a bottom and a plurality of trench sidewalls, a portion of the underlayer forming the bottom, the plurality of trench sidewalls forming at least a first angle with a down track direction;

providing at least one seed layer, at least a portion of the at least one seed layer residing in the trench;

providing a second mask of the plurality of masks on the intermediate layer, the second mask having a second aperture therein, the second aperture overlapping the trench in the overlap region and having a plurality of aperture sidewalls substantially parallel to the down track direction;

depositing at least one pole material after the step of providing the second mask, at least a portion of the main pole material residing in the overlap region such that a first portion of the at least one pole material is conformal with the plurality of trench sidewalls in a first portion of the overlap region and such a second portion of the at least one pole material that the at least one pole material is conformal with the plurality of aperture sidewalls in a second portion of the overlap region;

removing the second mask;

providing at least one refill material, a portion of the at least one refill material residing in a non-overlap region of the trench between the overlap region and the at least one sidewall;

removing a portion of the at least one pole material external to the overlap region using a planarization step to form a main pole, the main pole having a plurality of sidewalls forming the angle from the down track direction in a first region corresponding to the plurality of trench sidewalls such that the plurality of sidewalls are conformal with the plurality of trench sidewalls in the first region, and the plurality of sidewalls of the main pole being parallel to the down track direction in a second region corresponding to the plurality of aperture sidewalls such that the plurality of sidewalls are conformal with the second mask and nonconformal with the trench in the second region;

removing a portion of the intermediate layer external to the trench using a removal process, the at least one seed layer being resistant to the removal process; and providing a plurality of side shield separated from the main pole by a side gap, the side gap having a conformal portion and a nonconformal portion, the conformal portion including a first portion of the at least one seed layer and being adjacent to the ABS location and the overlap region, the nonconformal portion including a second portion of the at least one seed layer and the portion of the refill material, the conformal portion being between the ABS location and the nonconformal portion.

14. The method of claim 13 wherein the second mask is a frame mask.

15. The method of claim 14 wherein the step of providing the at least one seed layer further includes:

providing a Ta layer before the step of providing the second mask; and depositing a Ru layer after the step of providing the second mask.

* * * * *